United States Patent
Moravek et al.

(10) Patent No.: US 10,854,091 B2
(45) Date of Patent: Dec. 1, 2020

(54) ENERGY MANAGEMENT VISUALIZATION METHODS AND SYSTEMS

(71) Applicant: HONEYWELL INTERNATIONAL INC., Morris Plains, NJ (US)

(72) Inventors: Zdenek Moravek, Rozdrojovice (CZ); Ivan Lacko, Brno (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/026,423

(22) Filed: Jul. 3, 2018

(65) Prior Publication Data

US 2020/0013295 A1   Jan. 9, 2020

(51) Int. Cl.
  *G08G 5/00*   (2006.01)
  *G05D 1/06*   (2006.01)
  *G08G 5/02*   (2006.01)

(52) U.S. Cl.
  CPC ......... *G08G 5/0021* (2013.01); *G05D 1/0676* (2013.01); *G08G 5/006* (2013.01); *G08G 5/025* (2013.01)

(58) Field of Classification Search
  CPC ....................................................... G06F 7/00
  See application file for complete search history.

(56) References Cited

U.S. PATENT DOCUMENTS

| | | |
|---|---|---|
| 3,559,481 A | 2/1971 | Vietor |
| 4,319,219 A | 3/1982 | Rein-Weston |
| 6,112,141 A | 8/2000 | Briffe |
| 6,389,355 B1 | 5/2002 | Gibbs et al. |
| 6,584,382 B2 | 6/2003 | Karem |
| 6,629,023 B1 | 9/2003 | Silder, Jr. et al. |
| 7,068,187 B2 | 6/2006 | Ishihara et al. |
| 7,132,960 B2 | 11/2006 | Glover |
| 7,212,135 B1 | 5/2007 | Lynch et al. |
| 7,308,343 B1 | 12/2007 | Horvath et al. |
| 7,436,323 B2 | 10/2008 | Ishihara et al. |
| 7,471,997 B2 | 12/2008 | Tezuka |

(Continued)

OTHER PUBLICATIONS

Shish, K., et al.; Trajectory Prediction and Alerting for Aircraft Mode and Energy State Awareness.

(Continued)

*Primary Examiner* — Jean Paul Cass
(74) *Attorney, Agent, or Firm* — Lorenz & Kopf, LLP

(57) ABSTRACT

Methods and systems are provided for guiding or otherwise assisting a stabilized approach to a destination by presenting an energy state associated with an aircraft with respect to a target energy state for the stabilized approach. One method involves providing a graphical indication of a targeted energy state at a first position, a second graphical indication of a current energy state at a second position, and a third graphical indication of a configuration change at a third position. The distance with respect to a reference axis between the first position and the second position corresponds to a difference between a target parameter value associated with the targeted energy state and a current parameter value associated with the current energy state, and while a second distance between the first position and the third position with respect to the reference axis corresponds to an estimated amount of time before the configuration change.

16 Claims, 11 Drawing Sheets

(56) References Cited

U.S. PATENT DOCUMENTS

| | | |
|---|---|---|
| 7,647,140 B2 | 1/2010 | Demortier et al. |
| 7,818,100 B2 | 10/2010 | Goodman et al. |
| 7,882,394 B2* | 2/2011 | Hosek .................. G06F 11/008 714/26 |
| 7,957,878 B2 | 6/2011 | Rado |
| 8,014,912 B2 | 9/2011 | Zadrozynski et al. |
| 8,024,078 B2 | 9/2011 | Coulmeau |
| 8,126,599 B2 | 2/2012 | Coulmeau |
| 8,126,600 B2 | 2/2012 | Conner |
| 8,170,727 B2 | 5/2012 | Deker |
| 8,346,412 B2 | 1/2013 | Lacaze et al. |
| 8,412,392 B2 | 4/2013 | Jayathirtha et al. |
| 8,436,750 B2 | 5/2013 | Fabre |
| 8,532,844 B2 | 9/2013 | Wilson et al. |
| 8,682,580 B2 | 3/2014 | Clark et al. |
| 8,774,989 B1* | 7/2014 | Bush .................. B64D 43/02 701/14 |
| 8,781,654 B2 | 7/2014 | Giovannini et al. |
| 9,104,650 B2* | 8/2015 | Hosek .................. G06F 11/2257 |
| 9,828,107 B1* | 11/2017 | Ruymgaart .................. B64D 31/00 |
| 9,934,692 B2 | 4/2018 | Lacko et al. |
| 10,523,785 B2* | 12/2019 | Coulmeau .................. H04L 67/10 |
| 2002/0039070 A1 | 4/2002 | Ververs et al. |
| 2003/0229426 A1* | 12/2003 | Griffin, III ............. G01C 23/00 701/3 |
| 2004/0044446 A1 | 3/2004 | Staggs |
| 2004/0105264 A1* | 6/2004 | Spero .................. F21S 41/153 362/276 |
| 2005/0261813 A1 | 11/2005 | Ryan et al. |
| 2006/0004496 A1* | 1/2006 | Tucker .................. G01C 23/00 701/4 |
| 2006/0025901 A1 | 2/2006 | Demortier et al. |
| 2006/0200279 A1 | 9/2006 | Ainsworth et al. |
| 2006/0265110 A1 | 11/2006 | Ferro et al. |
| 2007/0142982 A1 | 6/2007 | Lorido |
| 2008/0140272 A1 | 6/2008 | Zadrozynski et al. |
| 2008/0162092 A1 | 7/2008 | Coulmeau et al. |
| 2008/0195301 A1 | 8/2008 | Fabre |
| 2008/0249675 A1 | 10/2008 | Goodman |
| 2008/0262665 A1 | 10/2008 | Coulmeau |
| 2009/0018713 A1 | 1/2009 | Coulmeau et al. |
| 2009/0043434 A1 | 2/2009 | Deker |
| 2009/0048724 A1 | 2/2009 | Caule |
| 2009/0319105 A1 | 12/2009 | Conner |
| 2010/0036551 A1* | 2/2010 | Lacaze .................. G05D 1/0676 701/18 |
| 2010/0191394 A1 | 7/2010 | Villaume |
| 2010/0198514 A1* | 8/2010 | Miralles .................. B64C 39/00 701/302 |
| 2010/0286852 A1 | 11/2010 | Bouquet |
| 2010/0318244 A1 | 12/2010 | Gomez et al. |
| 2011/0082605 A1 | 4/2011 | Coulmeau et al. |
| 2011/0166723 A1 | 7/2011 | Valentova et al. |
| 2011/0202208 A1 | 8/2011 | Karnik et al. |
| 2011/0246019 A1* | 10/2011 | Mineta ............. G08G 1/096816 701/31.4 |
| 2011/0264312 A1 | 10/2011 | Spinelli et al. |
| 2011/0320423 A1* | 12/2011 | Gemmell ............ G06F 16/9535 707/706 |
| 2012/0053760 A1 | 3/2012 | Burnside et al. |
| 2012/0091259 A1* | 4/2012 | Morris .................. B64C 27/02 244/17.13 |
| 2012/0191332 A1* | 7/2012 | Sawhill .................. G08G 5/045 701/120 |
| 2013/0026299 A1 | 1/2013 | Constans et al. |
| 2013/0204470 A1 | 8/2013 | Luckner et al. |
| 2013/0218374 A1 | 8/2013 | Lacko et al. |
| 2014/0257598 A1* | 9/2014 | Bailey .................. G08G 5/0052 701/3 |
| 2014/0277853 A1* | 9/2014 | Castillo-Effen ...... G08G 5/0034 701/3 |
| 2014/0343765 A1* | 11/2014 | Suiter .................. G08G 5/0021 701/18 |
| 2014/0343766 A1 | 11/2014 | Le Gall et al. |
| 2015/0127196 A1 | 5/2015 | Ishihara et al. |
| 2015/0151849 A1 | 6/2015 | Labastie et al. |
| 2016/0004374 A1 | 1/2016 | Kneuper et al. |
| 2016/0005150 A1* | 1/2016 | Ghassabian ......... G06F 3/04886 345/654 |
| 2016/0055400 A1* | 2/2016 | Jorquera ............ G06K 9/00624 416/1 |
| 2016/0085239 A1 | 3/2016 | Boyer et al. |
| 2016/0107766 A1 | 4/2016 | He et al. |
| 2016/0229554 A1 | 8/2016 | Kawalkar et al. |
| 2016/0257415 A1* | 9/2016 | Ye .......................... B64D 17/00 |
| 2016/0293016 A1* | 10/2016 | Rein-Weston ..... G01C 21/3469 |
| 2016/0362194 A1 | 12/2016 | Boyer et al. |
| 2016/0363456 A1* | 12/2016 | Pujos .................. G08G 5/0021 |
| 2017/0088284 A1 | 3/2017 | Holder |
| 2017/0168658 A1* | 6/2017 | Lacko .................. G01C 23/005 |
| 2017/0243495 A1 | 8/2017 | Moravek et al. |
| 2017/0358226 A1 | 12/2017 | Hodges et al. |
| 2018/0108261 A1* | 4/2018 | Zajac .................. G08G 5/0026 |
| 2018/0246205 A1* | 8/2018 | Surace .................. G01S 13/60 |
| 2018/0251230 A1* | 9/2018 | Chavez ................ G08G 5/0004 |
| 2019/0033862 A1* | 1/2019 | Groden ................ G08G 5/0056 |
| 2019/0118588 A1* | 4/2019 | Lesesky .................. G01S 19/13 |

OTHER PUBLICATIONS

Adami, T., et al.; An Energy Management Display for General Aviation Safety Enhancements; Ohio University Avionics Engineering Center, 33rd Digital Avionics Systems Conference, Colorado Springs, CO.

Croft, J.; Next-Generation EFBs Integral to NextGen Cockpit; Aviation Week & Space Technology; Retrieved from Internet [[http://aviationweek.com/aftermarket-solutions/next-generation-efbs-integral-nextgen-cockpit Jun. 5, 2018]].

USPTO Notice of Allowance for U.S. Appl. No. 14/967,557 dated Jul. 26, 2018.

EP Exam Report for Application 13154950.3 dated Jul. 19, 2018.

Becher, T.A., et al.; Methods for Maintaining Benefits for Merging Aircraft on Terminal RNAV Routes; 2004 IEEE.

Zadeh, V.T.; Fuzzy Logic Approach to Airplane Precision Instrument Approach and Landing; vol. 7, No. 4, Apr. 2012 ISSN 1819-6608 ARPN Journal of Engineering and Applied Sciences © 2006-2012 Asian Research Publishing Network (ARPN).

Ohme, P. A Model-Based Approach to Aircraft Takeo and Landing Performance Assessment; AIAA Atmospheric Flight Mechanics Conference Aug. 10-13, 2009, Chicago, Illinois.

Huisman, H. et al.; Crew Interfaces for Future ATM; Man Machine Integration Department National Aerospace Laboratory (NLR) Amsterdam The Netherlands;1997 IEEE.

EP Search Report for Application No. 13154950.3-1810/2654029 dated Jun. 10, 2016.

EP Exam Report for 13154950.3 dated Jun. 22, 2016.

Extended EP Search Report for Application No. 16199228.4-1803 dated Apr. 26, 2017.

* cited by examiner

ENERGY MANAGEMENT VISUALIZATION METHODS AND SYSTEMS

TECHNICAL FIELD

The subject matter described herein relates generally to vehicle systems, and more particularly, embodiments of the subject matter relate to aircraft systems capable of facilitating a stable approach to an airport by displaying energy management indicia on display devices that are constrained or subject to regulations.

BACKGROUND

Often, it is desirable to operate an aircraft in accordance with a stabilized approach when close to the airport (e.g., within a few miles and aligned with the runway) in order to land safely. The stabilized approach is generally defined in terms of a number of specific criteria, which may be set forth by a safety organization (e.g., the Flight Safety Foundation), a standards organization or other regulatory body, an airline, an aircraft manufacturer, or the like. Achieving a stabilized approach can be a challenging task, especially in certain circumstances such as adverse weather conditions, on-board malfunctions, low quality of air traffic control (ATC), bad crew cooperation, fatigue, visual illusions, inexperienced crew members, and the like.

Historically, flight crews relied on memorized manuals or acquired experience in performing approaches. If a stabilized approach is not performed, regulations may require the crew to commence a "go-around" procedure, however, in some instances, flight crews may disobey the regulations (e.g., to meet "on-time" metrics, minimize costs, or the like) or a flight crew in an unstabilized approach situation may believe that they will stabilize the aircraft in time for a safe landing. That said, unstabilized approaches have been shown to be a causal factor in several approach- and landing-related incidents. To reduce pilot workload and better facilitate a stable approach, approach stabilization advisory systems have been developed that attempt to guide the flight crew through a stable approach in order to reduce the chances of a "go-around," increase safety, reduce fuel consumption, and/or reduce noise over the approach corridor.

Electronic flight bags (EFBs) or other electronic devices are increasingly being utilized in aircraft cockpits to perform functions that were traditionally accomplished by using paper. Advanced EFB devices may be certified as part of the aircraft avionics system and integrated with aircraft systems. For certification, EFB devices or software applications often must comply with various regulations, such as, for example: an EFB device must be fixed aside the pilot during approach so that a pilot may consult it with only short irregular glances; an EFB cannot increase saliency of information by blinking, beeping or other auditory or tactile means; an EFB cannot display tactical information; an EFB cannot duplicate information or graphical symbols from avionics displays. Accordingly, it desirable to leverage EFBs to support stable approaches in a convenient and efficient manner while complying with applicable regulations or constraints.

BRIEF SUMMARY

Methods and systems are provided for guiding or otherwise assisting a stabilized approach to a destination by presenting an energy state associated with an aircraft with respect to a target energy state for the stabilized approach. One exemplary method of presenting an energy state associated with an aircraft involves providing, on a display device onboard the aircraft, a graphical user interface display comprising a reference axis, a first graphical indication of a targeted energy state at a first position with respect to the reference axis, a second graphical indication of a current energy state of the aircraft at a second position with respect to the reference axis, and a third graphical indication of a configuration change at a third position with respect to the reference axis. A first distance between the first position and the second position with respect to the reference axis on the graphical user interface display corresponds to a difference between a target parameter value associated with the targeted energy state and a current parameter value associated with the current energy state, and a second distance between the first position and the third position with respect to the reference axis on the graphical user interface display corresponds to an estimated amount of time before the configuration change. The method continues by dynamically updating the second distance on the graphical user interface display as the aircraft travels, wherein the first distance between the first graphical indication and the second graphical indication is dynamically updated to reflect an updated parameter value associated with an updated energy state of the aircraft.

Another exemplary embodiment of a method of presenting an energy state associated with an aircraft involves providing, on a display device onboard the aircraft, a graphical user interface display comprising a reference axis, a first graphical indication of a first parameter at a first position with respect to the reference axis, a second graphical indication of a second parameter at a second position with respect to the reference axis. A first distance between the first position and reference axis corresponds to a first difference between a first target value for the first parameter associated with a targeted energy state and a first current value for the first parameter associated with a current energy state of the aircraft, and a second distance between the second position and the reference axis corresponds to a second difference between a second target value for the second parameter associated with the targeted energy state and a second current value for the second parameter associated with the current energy state of the aircraft. The method continues by dynamically updating the first distance on the graphical user interface display as the aircraft travels to reflect a third difference between the first target value and a first updated value for the first parameter associated with an updated energy state of the aircraft, and dynamically updating the second distance on the graphical user interface display as the aircraft travels to reflect a fourth difference between the second target value and a second updated value for the second parameter associated with the updated energy state of the aircraft.

In yet another exemplary embodiment, a method of presenting an energy state associated with an aircraft involves providing, on a display device onboard the aircraft, a graphical user interface display comprising a plurality of energy zones, displaying a graphical indication of a current energy state of the aircraft on the graphical user interface display at an initial position within a respective one of the plurality of energy zones corresponding to a relationship between the current energy state of the aircraft and a target energy state according to a stable approach scenario, and dynamically updating the plurality of energy zones in response to a change in an orientation of the aircraft, wherein the graphical indication of the aircraft is displayed at an updated position with respect to the plurality of energy zones corresponding to an updated energy state of the aircraft with respect to the target energy state defined by the stable approach scenario.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
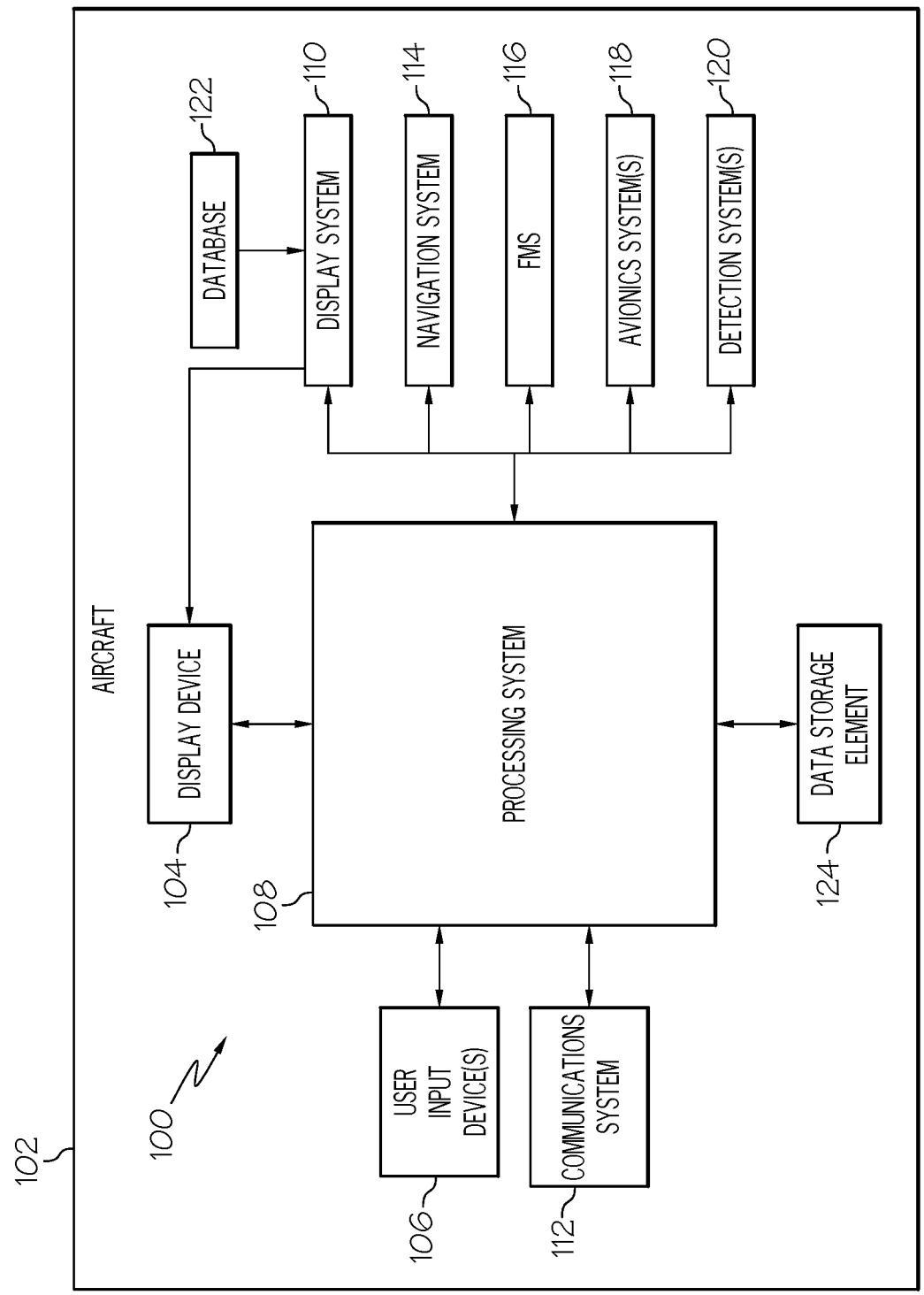
FIG. 1 is a block diagram of a system for an aircraft in an exemplary embodiment.

Embodiments of the subject matter described herein generally relate to systems and methods for facilitating a stable approach by a vehicle to a destination. As described in greater detail below, a stable approach is a navigational procedure that, when adhered to, ensures that the vehicle does not violate any applicable stabilization criteria (e.g., minimum and/or maximum travel rate limits, configuration or settings criteria for the vehicle, and the like) over a distance of travel proximate the destination. While the subject matter described herein could be utilized in various applications or in the context of various types of vehicles (e.g., automobiles, marine vessels, trains, or the like), exemplary embodiments are described herein in the context of determining a stable approach strategy for an aircraft that satisfies stabilization criteria upon reaching a particular point of the approach, alternatively referred to herein as the stabilization target. The stabilization target point of the approach represents a position relative to the airport where the aircraft should be stabilized for landing or otherwise commence a "go-around" procedure.

The stabilization criteria to be satisfied may include one or more of: a current aircraft speed equal to a desired target speed or within a desired range of speeds upon reaching the stabilization target point, a current aircraft descent rate less than or equal to a threshold descent rate upon reaching the stabilization target point, a particular aircraft configuration upon reaching the stabilization target point, a particular aircraft power setting upon reaching the stabilization target point, and/or a current aircraft heading upon reaching the stabilization target point that is aligned with or within a threshold of alignment with the intended runway. In this regard, U.S. Patent Publication No. 2013/0218374 provides an exemplary list of stabilization criteria that include, by way of example, an aircraft speed that is not more than 20 knots above the reference speed and not less than the reference speed (e.g., $V_{REF} \leq V \leq V_{REF}+20$ kt) and an aircraft descent rate that is not greater than 1000 feet per minute with the aircraft being in the correct landing configuration (e.g., landing gear extended) upon reaching a stabilization target point corresponding to a position along the approach that is 1000 feet above ground level (for instrument meteorological conditions) or 500 feet above ground level (for visual meteorological conditions).

In exemplary embodiments, a stable approach scenario to be presented or displayed to a pilot is determined based at least in part on the current position of the aircraft and a stabilization target position associated with an airport. In this regard, the presented approach scenario corresponds to an approach path and sequence of aircraft drag configurations results in the aircraft satisfying applicable stabilization criteria upon reaching the stabilization target position. In exemplary embodiments, a plurality of different scenarios for an approach path from the current position of the aircraft to the stabilization target position associated with the airport are initially determined. Each of the different scenarios involves a sequence of segments defining the approach path from the current aircraft position to the stabilization target position. Each segment of a respective scenario is associated with a particular aircraft configuration that is different from the aircraft configuration associated with other segments of that respective scenario. For example, one scenario may involve a segment with a first flap position, a segment with a second flap position, and a segment with the second flap position and landing gear extended. Another scenario may involve a segment with a first flap position, a segment with a second flap position and landing gear extended, and a segment with a third flap position and the landing gear extended. Yet another scenario may involve a segment with a first flap position and speedbrakes, a segment with a second flap position and landing gear extended and speedbrakes, and a segment with a third flap position and the landing gear extended and speedbrakes. In exemplary embodiments, a set of different approach scenarios corresponding to the different possible sequential combinations of aircraft configurations that may be employed during the approach to vary the amount of drag (e.g., flap positions, speedbrake settings, landing gear deployment, etc.) and satisfy stabilization criteria upon reaching the stabilization target position from the current aircraft position are determined, and the approach scenario to be presented is selected or otherwise identified from among the set of different approach scenarios based on a cost function or other selection criteria.

As described in greater detail below, primarily in the context of FIGS. 2 and 4-10, embodiments of the subject matter described herein provide energy management displays that include graphical indicia that help facilitate a stable approach, and which are also suitable for presentation by electronic flight bags (EFBs) or other supplemental display devices onboard an aircraft. In one or more exemplary embodiments, positions of the displayed indicia are dynamically updated with respect to indicia of a targeted energy state to reflect the current energy state of the aircraft relative to the targeted energy state of the aircraft at the current position or instant in time during execution of a stable approach. In this regard, the energy management displays described herein do not present the aircraft speed, altitude, or other parameters characterizing attributes of the current energy state in absolute terms, but rather, relative to targeted values for such parameters. Accordingly, any axes, scales, or the like that are presented on the energy management displays may be presented without labels or other indicia of absolute values associated therewith. By decluttering and reducing the amount of symbology or text presented, the amount of time required to perceptibly process and mentally orient oneself with the display, a pilot maintain situational awareness with respect to operating the aircraft while also being able to quickly glean relevant information from the supplemental display within a limited amount of time. It should be noted that although the subject matter is primarily described herein in the context of EFBs or other supplemental displays, the subject matter is not necessarily limited to use on or with any particular type of display device.

Referring now to FIG. 1, an exemplary embodiment of a system 100 which may be located onboard a vehicle, such as an aircraft 102, includes, without limitation, a display device 104, a user input device 106, a processing system 108, a display system 110, a communications system 112, a navigation system 114, a flight management system (FMS) 116, one or more avionics systems 118, one or more detection systems 120, and one or more data storage elements 122, 124 cooperatively configured to support operation of the system 100, as described in greater detail below.

In exemplary embodiments, the display device 104 is realized as an electronic display capable of graphically displaying flight information or other data associated with operation of the aircraft 102 under control of the display system 110 and/or processing system 108. In this regard, the display device 104 is coupled to the display system 110 and the processing system 108, wherein the processing system 108 and the display system 110 are cooperatively configured to display, render, or otherwise convey one or more graphical representations or images associated with operation of the aircraft 102 on the display device 104. For example, as described in greater detail below, a navigational map that includes a graphical representation of the aircraft 102 and one or more of the terrain, meteorological conditions, airspace, air traffic, navigational reference points, and a route associated with a flight plan of the aircraft 102 may be displayed, rendered, or otherwise presented on the display device 104.

The user input device 106 is coupled to the processing system 108, and the user input device 106 and the processing system 108 are cooperatively configured to allow a user (e.g., a pilot, co-pilot, or crew member) to interact with the display device 104 and/or other elements of the aircraft system 100, as described in greater detail below. Depending on the embodiment, the user input device 106 may be realized as a keypad, touchpad, keyboard, mouse, touch panel (or touchscreen), joystick, knob, line select key or another suitable device adapted to receive input from a user. In some embodiments, the user input device 106 is realized as an audio input device, such as a microphone, audio transducer, audio sensor, or the like, that is adapted to allow a user to provide audio input to the aircraft system 100 in a "hands free" manner without requiring the user to move his or her hands, eyes and/or head to interact with the aircraft system 100.

The processing system 108 generally represents the hardware, circuitry, processing logic, and/or other components configured to facilitate communications and/or interaction between the elements of the aircraft system 100 and perform additional processes, tasks and/or functions to support operation of the aircraft system 100, as described in greater detail below. Depending on the embodiment, the processing system 108 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 108 includes processing logic that may be configured to carry out the functions, techniques, and processing tasks associated with the operation of the aircraft system 100 described in greater detail below. Furthermore, the steps of a method or algorithm described in connection with the embodiments disclosed herein may be embodied directly in hardware, in firmware, in a software module executed by the processing system 108, or in any practical combination thereof. In accordance with one or more embodiments, the processing system 108 includes or otherwise accesses a data storage element 124, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 108, cause the processing system 108 to execute and perform one or more of the processes, tasks, operations, and/or functions described herein.

The display system 110 generally represents the hardware, firmware, processing logic and/or other components configured to control the display and/or rendering of one or more displays pertaining to operation of the aircraft 102 and/or systems 112, 114, 116, 118, 120 on the display device 104 (e.g., synthetic vision displays, navigational maps, and the like). In this regard, the display system 110 may access or include one or more databases 122 suitably configured to support operations of the display system 110, such as, for example, a terrain database, an obstacle database, a navigational database, a geopolitical database, a terminal airspace database, a special use airspace database, or other information for rendering and/or displaying navigational maps and/or other content on the display device 104. In this regard, in addition to including a graphical representation of terrain, a navigational map displayed on the display device 104 may include graphical representations of navigational reference points (e.g., waypoints, navigational aids, distance measuring equipment (DMEs), very high frequency omnidirectional radio ranges (VORs), and the like), designated special use airspaces, obstacles, and the like overlying the terrain on the map.

As described in greater detail below, in an exemplary embodiment, the processing system 108 includes or otherwise accesses a data storage element 124 (or database), which maintains information regarding airports and/or other potential landing locations (or destinations) for the aircraft 102. In this regard, the data storage element 124 maintains an association between a respective airport, its geographic location, runways (and their respective orientations and/or directions), instrument procedures (e.g., approaches, arrival routes, and the like), airspace restrictions, and/or other information or attributes associated with the respective airport (e.g., widths and/or weight limits of taxi paths, the type of surface of the runways or taxi path, and the like). Additionally, in accordance with one or more embodiments, the data storage element 124 also maintains status information for the runways and/or taxi paths at the airport indicating whether or not a particular runway and/or taxi path is currently operational along with directional information for the taxi paths (or portions thereof). The data storage element 124 may also be utilized to store or maintain other information pertaining to the airline or aircraft operator (e.g., airline or operator preferences, etc.) along with information pertaining to the pilot and/or co-pilot of the aircraft (e.g., pilot preferences, experience level, licensure or other qualifications, etc.).

Still referring to FIG. 1, in an exemplary embodiment, the processing system 108 is coupled to the navigation system 114, which is configured to provide real-time navigational data and/or information regarding operation of the aircraft 102. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art. The navigation system 114 is capable of obtaining and/or determining the instantaneous position of the aircraft 102, that is, the current (or instantaneous) location of the aircraft 102 (e.g., the current latitude and longitude) and the current (or instantaneous) altitude (or above ground level) for the aircraft 102. The navigation system 114 is also capable of obtaining or otherwise determining the heading of the aircraft 102 (i.e., the direction the aircraft is traveling in relative to some reference).

In an exemplary embodiment, the processing system 108 is also coupled to the FMS 116, which is coupled to the navigation system 114, the communications system 112, and one or more additional avionics systems 118 to support navigation, flight planning, and other aircraft control functions in a conventional manner, as well as to provide real-time data and/or information regarding the operational status of the aircraft 102 to the processing system 108. It should be noted that although FIG. 1 depicts a single avionics system 118, in practice, the aircraft system 100 and/or aircraft 102 will likely include numerous avionics systems for obtaining and/or providing real-time flight-related information that may be displayed on the display device 104 or otherwise provided to a user (e.g., a pilot, a co-pilot, or crew member). For example, practical embodiments of the aircraft system 100 and/or aircraft 102 will likely include one or more of the following avionics systems suitably configured to support operation of the aircraft 102: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In the illustrated embodiment, the onboard detection system(s) 120 generally represents the component(s) of the aircraft 102 that are coupled to the processing system 108 and/or the display system 110 to generate or otherwise provide information indicative of various objects or regions of interest within the vicinity of the aircraft 102 that are sensed, detected, or otherwise identified by a respective onboard detection system 120. For example, an onboard detection system 120 may be realized as a weather radar system or other weather sensing system that measures, senses, or otherwise detects meteorological conditions in the vicinity of the aircraft 102 and provides corresponding radar data (e.g., radar imaging data, range setting data, angle setting data, and/or the like) to one or more of the other onboard systems 108, 110, 114, 116, 118 for further processing and/or handling. For example, the processing system 108 and/or the display system 110 may generate or otherwise provide graphical representations of the meteorological conditions identified by the onboard detection system 120 on the display device 104 (e.g., on or overlying a lateral navigational map display). In another embodiment, an onboard detection system 120 may be realized as a collision avoidance system that measures, senses, or otherwise detects air traffic, obstacles, terrain and/or the like in the vicinity of the aircraft 102 and provides corresponding detection data to one or more of the other onboard systems 108, 110, 114, 116, 118.

In the illustrated embodiment, the processing system 108 is also coupled to the communications system 112, which is configured to support communications to and/or from the aircraft 102 via a communications network. For example, the communications system 112 may also include a data link system or another suitable radio communication system that supports communications between the aircraft 102 and one or more external monitoring systems, air traffic control, and/or another command center or ground location. In this regard, the communications system 112 may allow the aircraft 102 to receive information that would otherwise be unavailable to the pilot and/or co-pilot using the onboard systems 114, 116, 118, 120. For example, the communications system 112 may receive meteorological information from an external weather monitoring system, such as a Doppler radar monitoring system, a convective forecast system (e.g., a collaborative convective forecast product (CCFP) or national convective weather forecast (NCWF) system), an infrared satellite system, or the like, that is capable of providing information pertaining to the type, location and/or severity of precipitation, icing, turbulence, convection, cloud cover, wind shear, wind speed, lightning, freezing levels, cyclonic activity, thunderstorms, or the like along with other weather advisories, warnings, and/or watches. The meteorological information provided by an external weather monitoring system may also include forecast meteorological data that is generated based on historical trends and/or other weather observations, and may include forecasted meteorological data for geographical areas that are beyond the range of any weather detection systems 120 onboard the aircraft 102. In other embodiments, the processing system 108 may store or otherwise maintain historic meteorological data previously received from an external weather monitoring system, with the processing system 108 calculating or otherwise determining forecast meteorological for geographic areas of interest to the aircraft 102 based on the stored meteorological data and the current (or most recently received) meteorological data from the external weather monitoring system. In this regard, the meteorological information from the external weather monitoring system may be operationally used to obtain a "big picture" strategic view of the current weather phenomena and trends in its changes in intensity and/or movement with respect to prospective operation of the aircraft 102.

It should be understood that FIG. 1 is a simplified representation of the aircraft system 100 for purposes of explanation and ease of description, and FIG. 1 is not intended to limit the application or scope of the subject matter described herein in any way. It should be appreciated that although FIG. 1 shows the display device 104, the user input device 106, and the processing system 108 as being located onboard the aircraft 102 (e.g., in the cockpit), in practice, one or more of the display device 104, the user input device 106, and/or the processing system 108 may be located outside the aircraft 102 (e.g., on the ground as part of an air traffic control center or another command center) and communicatively coupled to the remaining elements of the aircraft system 100 (e.g., via a data link and/or communications system 112). In this regard, in some embodiments, the display device 104, the user input device 106, and/or the processing system 108 may be implemented as an electronic flight bag that is separate from the aircraft 102 but capable of being communicatively coupled to the other elements of the aircraft system 100 when onboard the aircraft 102. Similarly, in some embodiments, the data storage element 124 may be located outside the aircraft 102 and communicatively coupled to the processing system 108 via a data link and/or communications system 112. Furthermore, practical embodiments of the aircraft system 100 and/or aircraft 102 will include numerous other devices and components for providing additional functions and features, as will be appreciated in the art. In this regard, it will be appreciated that although FIG. 1 shows a single display device 104, in practice, additional display devices may be present onboard the aircraft 102. Additionally, it should be noted that in other embodiments, features and/or functionality of processing system 108 described herein can be implemented by or otherwise integrated with the features and/or functionality provided by the display system 110 or the FMS 116, or vice versa. In other words, some embodiments may integrate the processing system 108 with the display system 110 or the FMS 116; that is, the processing system 108 may be a component of the display system 110 and/or the FMS 116.

Figure 2:
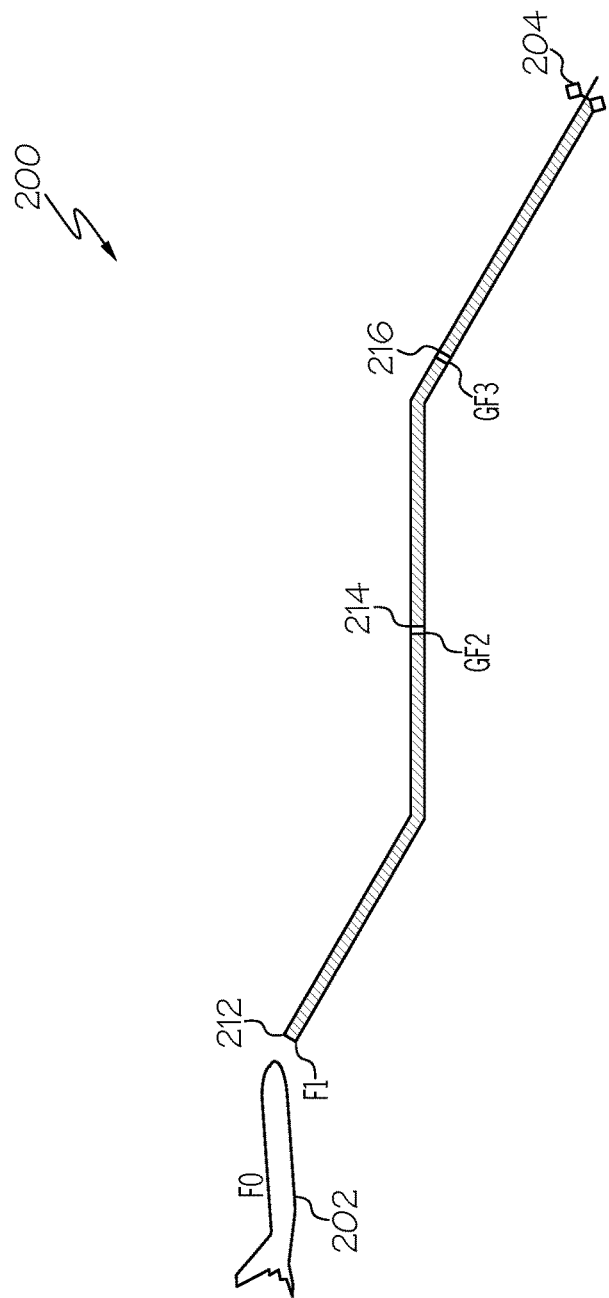
FIG. 2 depicts a vertical profile of an exemplary stable approach scenario in accordance with one or more embodiments.

Referring now to FIG. 2, and with continued reference to FIG. 1, in exemplary embodiments, the processing system 108 and/or the FMS 116 is configured to identify or otherwise determine a recommended approach scenario 200 for executing a stable approach from the current position 202 of the aircraft 102. In one or more embodiments, the processing system 108 and/or the FMS 116 obtains current status information pertaining to the aircraft 102 comprising the instantaneous, real-time or most recent available values for one or more parameters that quantify the current operation of the aircraft 102. For example, the processing system 108 may obtain (e.g., from FMS 116, navigation system 114 and/or other avionic systems 118) the current location of the aircraft 102 (or a particular distance from a navigational reference point or a desired track), the current altitude (or above ground level) of the aircraft 102, the current heading (or bearing) of the aircraft 102, the current amount of fuel remaining onboard the aircraft 102, the current engine status (e.g., whether any engine is disabled, whether afterburners are in operation, the current revolutions per minute, and/or the like), and the current aircraft configuration (e.g., the current flap configuration).

The processing system 108 and/or the FMS 116 also identifies or otherwise determines the approach path to be flown between the current aircraft position and the destination airport. For example, based on the flight plan maintained by the FMS 116 or in an onboard data storage element 124, the processing system 108 may identify the approach procedure selected for the aircraft for the runway the aircraft is intended to land on at the destination airport. In this regard, the approach procedure may identify or otherwise include navigational reference points (or waypoints) that define the route to be flown en route to the airport for landing at the desired runway. Additionally, in some embodiments, the approach procedure may define altitude criteria associated with one or more of the navigational reference points that may constrain the approach flight path (e.g., altitude minima or maxima).

In exemplary embodiments, the processing system 108 and/or FMS 116 also receives or otherwise obtains meteorological information pertaining to the approach path to be flown. For example, the processing system 108 may obtain, either from the onboard detection systems 120 or an external system via communications system 112, current meteorological conditions pertaining to the current position of the aircraft 102, such as, for example, the current temperature, wind speed, wind direction, atmospheric pressure, turbulence, and the like. The processing system 108 may also obtain current or real-time meteorological information pertaining to the approach path between the current aircraft position and the airport from one or more of the onboard detection system(s) 120 and/or any external weather monitoring system(s) via the communications system 112. Additionally, the processing system 108 may obtain forecasted meteorological information for points or locations on or around the approach path from one or more of the onboard detection system(s) 120 and/or any external weather monitoring system(s) for forecast time periods between the current time and the estimated time when the aircraft is expected to traverse a respective portion of the approach path.

It should be noted that the obtained meteorological information may be three-dimensional to account for potential changes in the flight level or altitude of the aircraft 102 during execution of the approach. In some embodiments, the processing system 108 also correlates or otherwise translates the meteorological information to navigational reference points along the approach path. For example, meteorological information for points that are not along the approach path may be correlated or translated to nearby navigational reference points along the approach path. Meteorological information may be integrated, fused, extrapolated, interpolated, or otherwise combined to achieve likely meteorological information at or near the location associated with a particular navigational reference point that may be utilized for navigating the aircraft 102. Moreover, in some embodiments the meteorological information corresponding to different locations may be further integrated, fused, extrapolated, interpolated, or otherwise combined to achieve likely meteorological information for points along the approach path that otherwise intervene between navigational reference points or between the aircraft 102 and respective navigational reference points. Thus, meteorological data points may be essentially translated from a meteorological weather grid domain to a navigational reference point domain that can be utilized for navigating the aircraft 102.

In exemplary embodiments, the processing system 108 and/or FMS 116 then generates or otherwise determines a plurality of different potential approach scenarios for flying the aircraft along the approach path between the current aircraft position and a stabilization target position using speed criteria associated with different configurations of the aircraft and the obtained meteorological information. In this regard, for each potential aircraft configuration, the data storage element 124 may maintain one or more allowable speeds (or a range thereof) for transitioning to and/or from that aircraft configuration. Each potential aircraft configuration may be defined by a unique combination of an engine operating status (e.g., a number of engines in operation), a flap position, a speedbrake status (e.g., whether or not speedbrakes are being employed), and a landing gear status (e.g., whether or not landing gear are deployed). Additional parameters or criteria may be utilized to further define potential aircraft configurations, such as, for example, whether or not the aircraft is descending or flying in level flight, such as is described in Table 1 of U.S. Patent Publication No. 2013/0218374.

Based on the current aircraft configuration, a plurality of different potential sequences of aircraft configurations may be determined based on the available potential aircraft configurations. In exemplary embodiments, each of the potential sequences progresses from the current aircraft configuration through one or more additional aircraft configurations successively providing an increased amount of drag. For each potential sequence of aircraft configurations, a potential approach scenario is determined that includes a plurality of different sequential approach segments, where each of the different segments is associated with a respective one of the aircraft configurations in the sequence. The potential approach scenario also identifies the aircraft speed at the start of a respective segment (i.e., the speed at which a respective change in configuration of the sequence should occur) along with the flight path angle associated with a respective segment.

To determine the different approach scenarios, the stabilization target position 204 is identified as a position on the glide slope for the approach path at the desired stabilization height above the airport (e.g., the location along the glide slope path that is 1000 feet above ground level for instrument conditions). For each different approach scenario, the respective distance (or length) and the respective altitude descended of each respective segment may be optimized or otherwise adjusted so that the sequence of segments fits between the stabilization target position 204 and the current aircraft position 202. In one or more embodiments, the processing system 108 determines the length for the respective segments of an approach scenario by working backwards from the stabilization target position 204 to the current aircraft position 202 and based on an assumption of the aircraft satisfying the stabilization criteria at the stabilization target position 204. That said, in other embodiments, the processing system 108 may determine the transition speeds and lengths for the respective segments working forward from the current aircraft position 202.

In exemplary embodiments, the data storage element 124 stores or otherwise maintains a flight model quantifying or otherwise describing deceleration characteristics of the different configurations of the aircraft 102. The processing system 108 utilizes the model to calculate or otherwise determine a lateral distance required for the aircraft to decelerate and traverse the respective segment in a stable manner based on the current and/or forecasted meteorological conditions pertaining to the segment (e.g., headwinds, tailwinds, or the like), the current and/or predicted aircraft weight at various stages of the approach, any current speed and/or altitude constraints from air-traffic control or defined by the approach procedure, and the like. The approach scenarios determined by the processing system 108 thereby satisfy applicable stabilization criteria at the stabilization target position 204 while also transitioning to/from different aircraft configurations with appropriate speeds for the respective aircraft configurations. In this regard, in some embodiments, when a particular sequence of aircraft configurations is unable to satisfy applicable stabilization criteria at the stabilization target position based on the current aircraft status, the potential approach scenario corresponding to that respective sequence of aircraft configurations may be discarded or otherwise excluded from analysis as being unusable. Further details of how potential approach scenarios can be generated which are not germane to the subject matter described herein can be found in U.S. Patent Publication No. 2013/0218374, which is hereby incorporated by reference.

From among the various potential approach scenarios, the processing system 108 and/or FMS 116 may select or otherwise identify a recommended approach scenario for display or presentation to the pilot using one or more cost functions or other selection criteria. In this regard, FIG. 2 depicts a vertical profile for an approach scenario 200 for descending from a current aircraft position 202 and reaching a stabilization target position 204 along the glide slope path (e.g., at 1000 feet above ground level) while satisfying one or more stabilization criteria for a stable approach upon reaching the stabilization target position 204 (e.g., an aircraft speed upon reaching the stabilization target position 204 that is equal to a stable approach speed criterion or within a desired threshold amount or percentage of the stable approach speed criterion, etc.). Based on the current aircraft position 202, the current status of the aircraft (e.g., the current airspeed, current weight, current flap configuration not extended (F0), etc.), the identified approach scenario entails an initial segment defined by transition points 212 and 214, where flaps are extended to a first position (F1) at the initial transition position 212, followed by an intermediate segment defined by transition points 214 and 216, where flaps are extended to a second position (F2) and landing gear is extended (G) at the second transition position 214 (GF2), and a final segment defined by transition position 216 and the stabilization target position 204, where flaps are extended to a third position (F3) while landing gear is maintained extended upon reaching the final transition position 216 (GF3).

Figure 3:
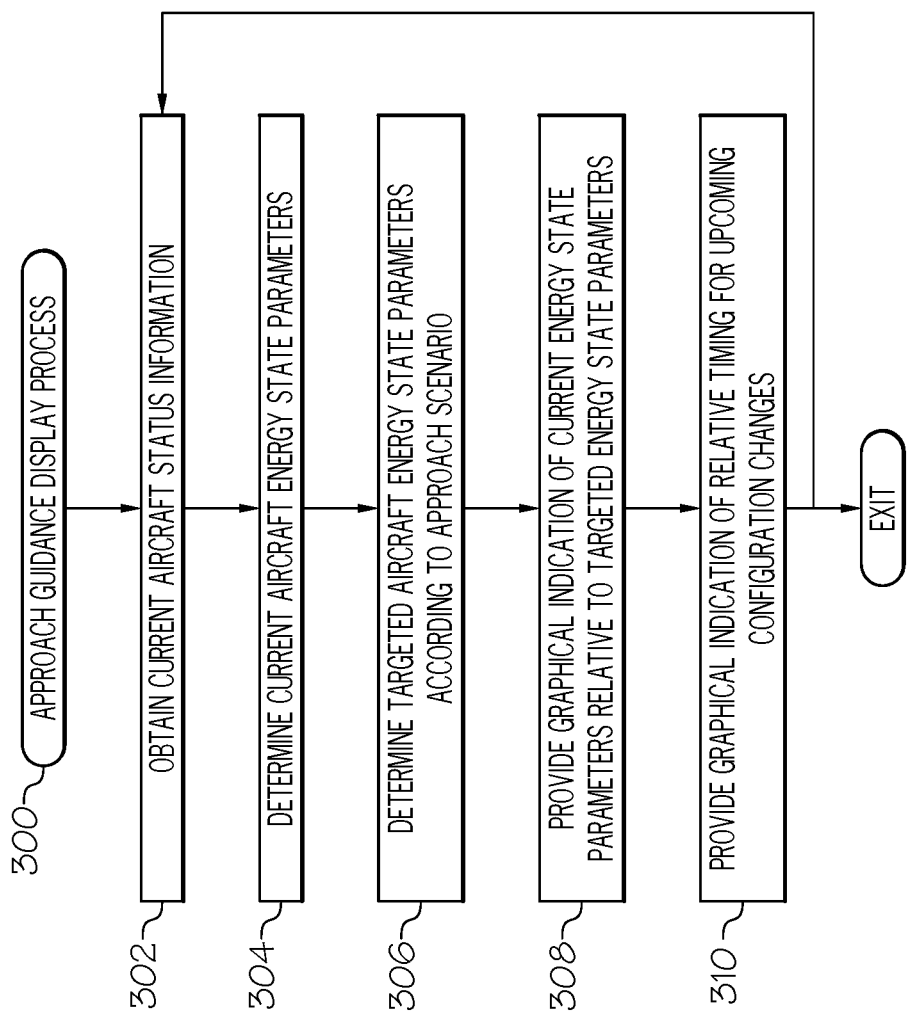
FIG. 3 is a flow diagram of an exemplary approach guidance display process suitable for use with the aircraft in the system of FIG. 1 in accordance with one or more embodiments.

Referring now to FIG. 3, in an exemplary embodiment, the aircraft system 100 is configured to support an approach guidance display process 300 to display, present, or otherwise provide graphical indicia facilitating execution of a stable approach on a supplemental display device and perform additional tasks, functions, and operations described below. The various tasks performed in connection with the illustrated process 300 may be implemented using hardware, firmware, software executed by processing circuitry, or any combination thereof. For illustrative purposes, the following description may refer to elements mentioned above in connection with FIG. 1. In practice, portions of the approach guidance display process 300 may be performed by different elements of the system 100, such as, the processing system 108, the display system 110, the communications system 112, the navigation system 114, the FMS 116, the onboard avionics systems 118 and/or the onboard detection systems 120. It should be appreciated that the approach guidance display process 300 may include any number of additional or alternative tasks, the tasks need not be performed in the illustrated order and/or the tasks may be performed concurrently, and/or the approach guidance display process 300 may be incorporated into a more comprehensive procedure or process having additional functionality not described in detail herein. Moreover, one or more of the tasks shown and described in the context of FIG. 3 could be omitted from a practical embodiment of the approach guidance display process 300 as long as the intended overall functionality remains intact.

The illustrated approach guidance display process 300 begins by obtaining current status information pertaining to the aircraft and identifying or otherwise determining one or more current aircraft energy state parameters pertaining to execution of the stable approach (tasks 302, 304). As described above, the processing system 108 may obtain (e.g., from FMS 116, navigation system 114 and/or other avionic systems 118) the current location of the aircraft 102 (or a particular distance from a navigational reference point or a desired track), the current altitude (or above ground level) of the aircraft 102, the current heading (or bearing) of the aircraft 102, the current amount of fuel remaining onboard the aircraft 102, the current engine status, the current aircraft configuration (e.g., the current flap configuration), and/or other instantaneous, real-time or recent values for one or more parameters that quantify the current operation of the aircraft 102. The processing system 108 identifies or determines one or more current aircraft energy state parameter values using the current aircraft status information obtained from the onboard system(s) 114, 116, 118, such as, for example, the current aircraft speed value, the current aircraft altitude value, the current aircraft drag configuration, and/or the like. In some embodiments, the processing system 108 may calculate or otherwise determine an energy metric as a function of one or more current parameter values. For example, the total energy associated with the aircraft may be calculated as a function of the current aircraft speed, current aircraft altitude, and the current aircraft weight, which may be calculated or estimated based on fuel remaining.

The approach guidance display process 300 also calculates or otherwise determines one or more targeted aircraft energy state parameters based on the approach scenario to be flown (task 306). For example, based on the current latitudinal position of the aircraft 102 with respect to the stabilization target position, the processing system 108 may determine one or more targeted aircraft energy state parameter values according to the approach scenario. In this regard, the processing system 108 calculates the targeted altitude value, targeted aircraft speed value, or other targeted energy state parameter value that assumes the aircraft 102 is in adherence with the selected stable approach scenario (e.g., by flying in the appropriate drag configuration for the segment corresponding to the lateral position of the aircraft 102 and at the appropriate altitude and speed for that lateral position along the approach path). In other words, the targeted aircraft energy state parameter values represent the predicted or expected energy state of the aircraft 102 if the pilot where progressing through the sequence of drag configurations for the selected approach scenario at the prescribed aircraft speeds and lateral positions for the transitions between configurations while also flying at the altitude prescribed by the approach path at those lateral positions.

For example, the targeted altitude and airspeed values may be calculated or determined by working backwards from the stabilization target position to the current aircraft position using the drag configurations, speeds, altitudes, flight path angles, and the like prescribed by the approach scenario and the aircraft flight model.

The approach guidance display process 300 continues by displaying or otherwise presenting graphical indicia of the current energy state parameter value(s) relative to the targeted energy state parameter value(s) (task 308). In this regard, the processing system 108 generates or otherwise provides, on a display device, one or more graphical indicia that indicate the relative difference between the current energy state parameter value(s) and the targeted energy state parameter value(s). As described in greater detail below, the approach guidance display process 300 repeats during execution of the approach to dynamically update the graphical indicia of the current energy state parameter value(s) relative to the targeted energy state parameter value(s) as the aircraft travels. In this regard, for an updated aircraft position, the approach guidance display process 300 dynamically determines one or more updated target energy parameter value(s) for that position with respect to the stabilization target position and then updates the graphical indicia to indicate the current or real-time difference between the dynamically updated energy state parameter value(s) for the aircraft and the updated target energy parameter value(s). Thus, a pilot can utilize the indicia to quickly gauge how the pilot is flying the approach relative to the recommended approach scenario.

In one or more embodiments, the approach guidance display process 300 also displays or otherwise presents graphical indicia of future aircraft configuration changes relative to the current aircraft state while concurrently presenting graphical indicia of the current energy state parameter value(s) relative to the targeted energy state parameter value(s) (task 310). In this regard, the graphical indicia of future aircraft configuration changes may indicate the relative amount of time or distance to be traveled before the configuration change should occur with respect to a common axis that also conveys the relative difference between a current energy parameter value and a targeted energy parameter value. As the approach guidance display process 300 repeats during execution of the approach, any depicted graphical indicia of future aircraft configuration changes are also dynamically updated to reflect the relative amount of time or distance before a depicted configuration change should be initiated. Thus, a pilot can utilize the indicia to quickly gauge the relative amount of time or distance required before reaching a configuration change prescribed by the recommended approach scenario while concurrently gauging the relative energy state of the aircraft.

Figure 4:
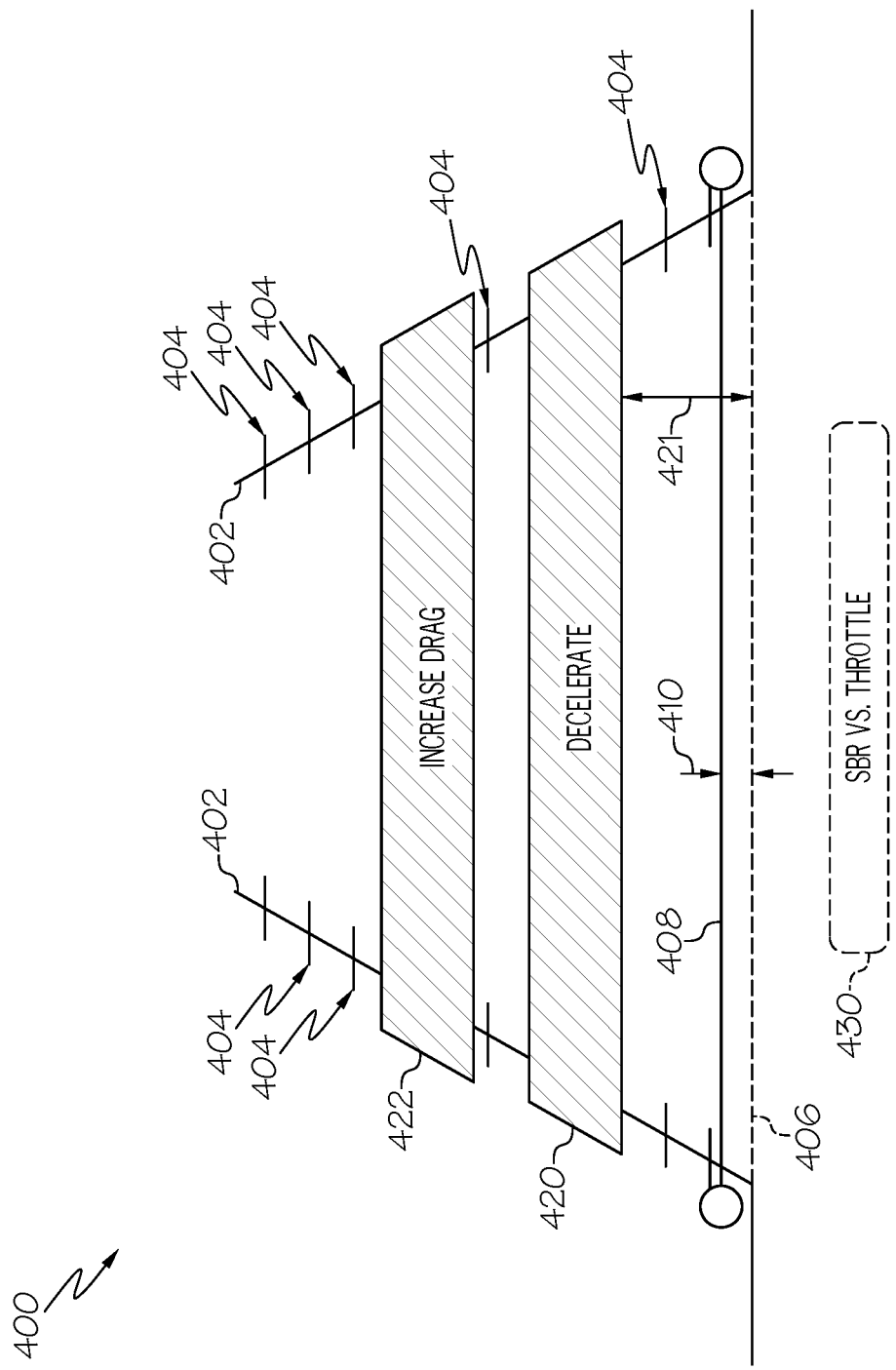
FIGS. 4-5 depict exemplary forward-looking perspective view graphical user interface (GUI) displays including graphical indicia of the current energy state of the aircraft suitable for presentation on a display device in the aircraft system of FIG. 1 in conjunction with the approach guidance display process of FIG. 2 in accordance with one or more embodiments.

FIG. 4 depicts an exemplary embodiment of a forward-looking supplemental energy management GUI display 400 suitable for presentation on a supplemental display device onboard an aircraft in conjunction with the approach guidance display process 300 of FIG. 3. The forward-looking display 400 includes a pair of reference axes 402 that emanate from a lower edge of the display 400 and converge towards a vanishing point along a horizon proximate upper edge of the display 400 to provide a perspective view. The reference axes 402 correspond to a lateral position of the aircraft 102, with equidistant tick marks 404 along the reference axes 402 that advance towards the lower edge of the display 400 at a rate corresponding to the speed of the aircraft 102. In this regard, depending on the embodiment, the distance between successive tick marks 404 on a respective axis 402 may correspond to a particular unit of speed, distance, or latitudinal travel time.

The GUI display 400 includes a first horizontal graphical indication 406 of the current aircraft speed that intersects the reference axes 402 and a second horizontal graphical indication 408 of a targeted speed that intersects the reference axes 402. The illustrated current aircraft speed indicator 406 includes a dashed line segment spanning the horizontal distance between the reference axes 402 with solid line segments extending laterally beyond the reference axes 402. The illustrated target aircraft speed indicator 408 includes a solid line segment spanning the horizontal distance between the reference axes 402 with end portions outside of the reference axes 402. The end portions are visually distinguishable from the extension portions of the current aircraft speed indicator 406, thereby visually differentiating the target aircraft speed and the current aircraft speed and their relative difference with respect to the reference axes 402. In this regard, FIG. 4 depicts a situation where the current aircraft speed is below the targeted aircraft speed, with the vertical distance 410 between the speed indicators 406, 408 corresponding to the relative difference between the targeted aircraft speed and the current aircraft speed. For example, the distance between successive tick marks 404 may correspond to a difference of 10 knots. If the tick marks 404 on the reference axes 402 correspond to distance or time, the two indicators 406 and 408 relate to the current distance or estimated time to go for reaching the destination to the targeted distance or estimated time to go given the current aircraft energy state.

Still referring to FIG. 4, as the aircraft travels, the GUI display 400 is dynamically updated by advancing the tick marks 404 toward the current aircraft speed indicator 406 at a rate corresponding to the current aircraft speed, and with the depicted distance 410 between the speed indicators 406, 408 dynamically updating to reflect the current difference between the current, real-time aircraft speed and the targeted speed for the current position of the aircraft 102 according to the recommended approach scenario. In this regard, as the aircraft travels and the current speed of the aircraft 102 increases relative to the dynamically updating target speed according to the approach scenario for the dynamically updating aircraft position, the distance 410 on the display 400 between the two indicators 406, 408 decreases in proportion to the relative difference between the two speeds. Conversely, as the current speed of the aircraft 102 decreases relative to the dynamically updated target speed according to the approach scenario for the dynamically updating aircraft position, the distance 410 on the display 400 between the two indicators 406, 408 increases.

Figure 5:
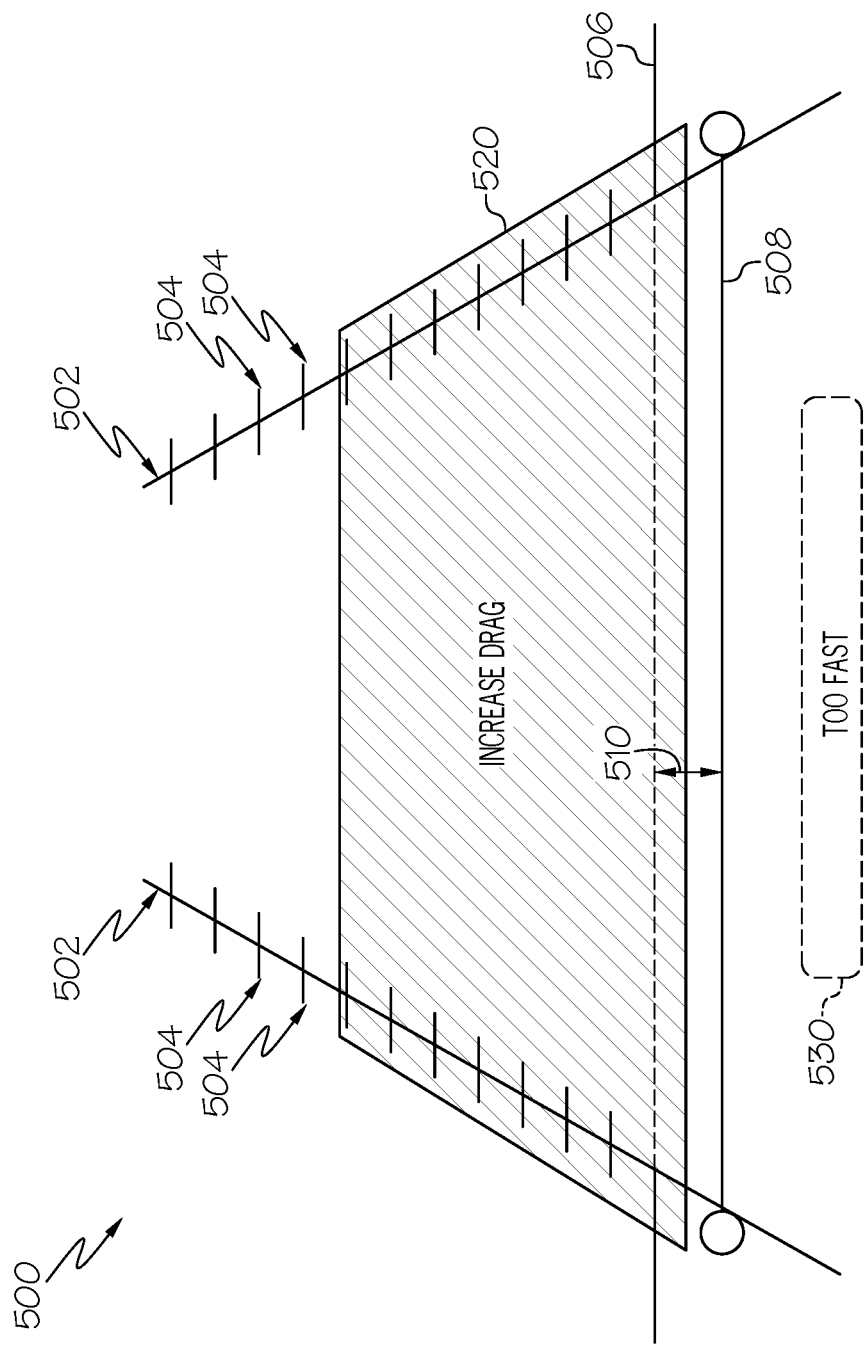

FIG. 5 depicts another exemplary forward-looking supplemental energy management GUI display 500 with perspectival reference axes 502, where the current aircraft speed represented by horizontal indicator 506 is faster than the targeted aircraft speed represented by horizontal indicator 508. In this regard, the target aircraft speed indicator 508 is positioned towards the lower edge of the display 500 beneath the current aircraft speed indicator 506, with the vertical distance 510 between the horizontal speed indicators 506, 508 corresponding to the relative amount of speed by which the aircraft is currently exceeding the stable approach target for the current aircraft position. As the aircraft travels and the current speed of the aircraft 102 increases relative to the dynamically updating target speed according to the approach scenario for the dynamically updating aircraft position, the distance 510 on the display 500 between the two indicators 506, 508 dynamically increases in proportion to the relative difference in speeds. Conversely, as the current speed of the aircraft 102 decreases relative to the target speed according to the approach scenario, the distance 510 on the display 500 between the two indicators 506, 508 decreases.

Still referring to FIGS. 4-5, in exemplary embodiments, graphical indicia of one of more upcoming aircraft configuration changes according to the current approach scenario are also depicted on the forward-looking displays 400, 500. In this regard, the positioning of the configuration change indicia with respect to the reference axes 402, 502 and relative to the current aircraft speed indicator 406, 506 corresponds to the relative amount of distance or travel time before the configuration change is intended to occur according to the current approach scenario. In this regard, based on the rate at which the tick marks 404, 504 are advancing towards the lower edge or viewpoint, the configuration change indicia are position at a vertical distance ahead of the current aircraft speed indicator 406, 506 that corresponds to the amount of distance or travel time before the configuration change is to occur. In one or more embodiments, the positioning of the configuration change indicia is fixed with respect to the reference axes 402, 502 such that the configuration change indicia advance towards the viewer in unison with the tick marks 404, 504 on the reference axes 402, 502. In other embodiments, the configuration change indicia may advance independent of the reference axes 402, 502.

For example, FIG. 4 includes a graphical indicator 420 in advance of the current airspeed indicator 406 that indicates an amount of travel time or distance into the future before the pilot should reduce the thrust to idle. In the illustrated embodiment, the thrust configuration change indicator 420 is realized as a horizontal bar that spans the reference axes 402 and includes text within the bar that suggests or otherwise indicates the configuration change (or the nature thereof). In various embodiments, the bar for the thrust configuration change indicator 420 may be filled or otherwise rendered using one or more visually distinguishable characteristics to differentiate the thrust configuration change indicator 420 from the speed indicators 406, 408. The vertical distance 421 between the indicators 406, 420 corresponds to the relative amount of time before the thrust should be reduced to idle, which, in the illustrated embodiment, corresponds to the amount of time required for a total of three tick marks 404 advancing towards the viewer to reach or surpass the current aircraft speed indicator 406. In this regard, the current aircraft speed may dictate the rate at which the tick marks 404 advanced toward the viewer, with the rate then being utilized to determine the positioning of the thrust configuration change indicator 420 to reflect the estimated amount of travel time required for the aircraft 102 to reach the position within the approach scenario where idle thrust should occur from the current aircraft position. Accordingly, as the current aircraft speed increases, the rate at which the tick marks 404 and the thrust configuration change indicator 420 advance toward the viewer may increase, and vice versa (assuming the aircraft does not deviate from the predefined or planned trajectory for the approach). In exemplary embodiments, the thrust configuration change indicator 420 reaching the current aircraft speed indicator 406 indicates, to the pilot, that the thrust should be reduced to idle at that point in time. In this regard, when the current aircraft speed is below the target aircraft speed, the deceleration may be delayed, while the deceleration may be initiated earlier when the current aircraft speed exceeds the target aircraft speed.

The GUI display 400 also includes a graphical indicator 422 in advance of the current airspeed indicator 406 that indicates an amount of travel time or distance into the future before the pilot should adjust the physical configuration of the aircraft to increase drag. Similar to the thrust configuration change indicator 420, the drag configuration change indicator 422 is realized as a horizontal bar that spans the reference axes 402 and includes text within the bar that indicates drag should be increased. Again, the vertical distance between the drag configuration change indicator 422 and the current aircraft speed indicator 406 corresponds to the relative amount of time before the configuration change should occur according to the stable approach scenario being flown.

FIG. 5 similarly depicts a drag configuration change indicator 522 spanning the reference axes 502. In this regard, FIG. 5 depicts a scenario where the aircraft 102 has traversed a position within the approach scenario where the physical configuration of the aircraft should have been changed to increase drag according to the approach scenario, which is indicated by the current aircraft speed indicator 506 traversing the lower edge of the drag configuration change indicator 522. The drag configuration change indicator 522 may persist or otherwise remain displayed on the GUI display 500 even after the aircraft 102 has traversed the position of the configuration change to continue to provide indication to the pilot that a configuration change is required for the stable approach scenario being flown. In response to feedback from an onboard system 116, 118 indicating the physical configuration of the aircraft 102 being changed to increase drag, the display 500 may be dynamically updated by removing the drag configuration change indicator 522 from the display 500.

The GUI displays 400, 500 also include textual representations 430, 530 of hints, suggestions, or other guidance pertaining to the approach. For example, the GUI display 400 includes text 430 that indicates that the pilot should consider the potential usage of speedbrakes or throttle during the approach when operating the aircraft. In this regard, for the situation depicted in FIG. 4, failure to reach the target speed prior to the thrust configuration change could result in the need to undesirably increase thrust later during the approach, while exceeding the target speed could result in the need to undesirably deploy speedbrakes at some point during the approach. Thus, the text 430 reminds the pilot of the various energy management considerations relevant to the current operation of the aircraft. In FIG. 5, the textual notification 530 indicates that the current aircraft speed is undesirably high, thereby helping to ensure the pilot acts to increase the drag or otherwise reduce the speed towards the target. That said, such hints may not be provided in situations where regulations limit or restrict their presentation, thereby leaving any decision-making to the pilot's discretion.

Figure 6:
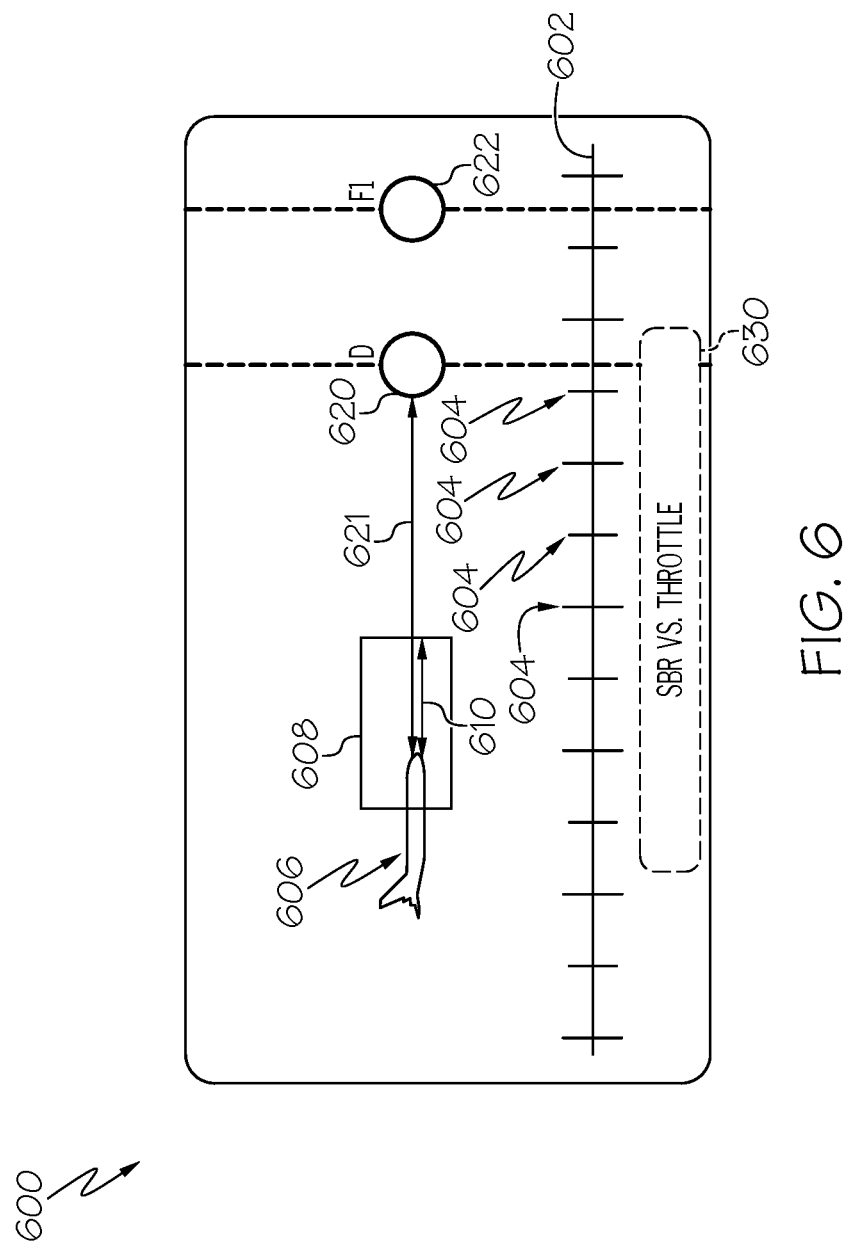
FIGS. 6-7 depict exemplary vertical profile GUI displays including graphical indicia of the current energy state of the aircraft suitable for presentation on a display device in the aircraft system of FIG. 1 in conjunction with the approach guidance display process of FIG. 2 in accordance with one or more embodiments.

FIG. 6 depicts an exemplary embodiment of a vertical profile supplemental energy management GUI display 600 suitable for presentation on a supplemental display device onboard an aircraft in conjunction with the approach guidance display process 300 of FIG. 3. The vertical profile energy management display 600 includes a reference axis 602 corresponding to the lateral position of the aircraft and a vertical scale corresponding to a relative altitude of the aircraft 102. The reference axis 602 includes equidistant tick marks 604 along the reference axes 402 that advance with respect to a graphical representation 606 of the aircraft 102 at a rate corresponding to the speed of the aircraft 102. In this regard, depending on the embodiment, the distance between successive tick marks 604 may correspond to a particular unit of speed, distance, or travel time.

The aircraft indicator 606 may be vertically positioned at an intermediate position equidistant from the reference axis 602 and the upper edge of the display 600, such that other elements on the display 600 may be positioned vertically with respect to the aircraft indicator 606 that indicates respective altitudes associated with such elements relative to the current aircraft altitude. A target aircraft position indicator 608 is also presented at a vertical position relative to the aircraft indicator 606 that corresponds to a relative altitude difference between the current aircraft altitude and a target altitude of the aircraft 102 at the current lateral position of the aircraft 102 according to the stable approach scenario being flown. In this regard, when the aircraft indicator 606 is above the target aircraft position indicator 608, the aircraft 102 is above the desired stable approach flight path, and conversely, when the aircraft 102 is below the desired stable approach flight path when the aircraft indicator 606 is below the target aircraft position indicator 608.

The target aircraft position indicator 608 is also presented at a lateral position relative to the aircraft indicator 606 that corresponds to a relative difference between the current aircraft speed and a target speed of the aircraft 102 at the current lateral position of the aircraft 102 according to the stable approach scenario being flown. Alternatively, the target aircraft position indicator 608 may be presented at a lateral position relative to the aircraft indicator 606 that corresponds to a relative difference between the current lateral position of the aircraft 102 and a target lateral position according to the stable approach scenario being flown, or a relative difference between a current expected time of arrival for reaching the stabilization target position from the current aircraft position compared to the predicted expected time of arrival for reaching the stabilization target position according to the stable approach scenario. Thus, the horizontal distance 606 between the leading edge of the aircraft indicator 606 and the target aircraft position indicator 608 corresponds to the relative difference between the current speed (or lateral position or travel time) of the aircraft 102 and the target value according to the stable approach scenario at the current position within the stable approach scenario.

In the illustrated embodiment, the target aircraft position indicator 608 is realized as a rectangle (or box) having dimensions configured to encompass the aircraft indicator 606 when the current position and energy state of the aircraft 102 corresponds to the targets defied by the stable approach scenario being flown. Thus, the pilot may utilize the GUI display 600 for guidance on how to alter operation of the aircraft 102 to maintain the aircraft indicator 606 within the target aircraft position box 608. In exemplary embodiments, as the aircraft travels, the aircraft indicator 606 is maintained at a fixed location while the vertical and lateral positions of the target aircraft position box 608 are dynamically updated to reflect the current real-time differential between the current aircraft speed and altitude and the targeted aircraft speed and altitude for the stable approach. Additionally, the reference axis 602 and tick marks 604 may be dynamically updated by advancing towards or beyond the aircraft indicator 606 at a rate that corresponds to the lateral rate of travel of the aircraft 102.

Similar to the GUI displays 400, 500 described above in the context of FIGS. 4-5, the GUI display 600 also includes configuration change indicia 620, 622 that are horizontally positioned with respect to the aircraft indicator 606 and the reference axis 602, 622 such that the horizontal distance with respect to the reference axis 602 corresponds to the amount of distance or travel time before reaching the position within the approach scenario where a respective aircraft configuration change is intended to occur. For example, a deceleration configuration change indicator 620 may be presented at a horizontal distance 621 from the aircraft indicator 606 with respect to the reference axis 602 that indicates the amount of lateral distance or travel time before the aircraft 102 is expected to reach the position within the approach scenario where the aircraft 102 is to be configured for idle thrust. As the aircraft travels, the horizontal distance 621 is dynamically updated to reflect the change in the amount of distance or time travel required before the configuration change is to occur. Thus, as the aircraft speed increases, the deceleration configuration change indicator 620 may advance towards the aircraft indicator 606 at an increased rate, and vice versa. Similarly, a flap configuration change indicator 622 is presented with respect to the aircraft indicator 606 to indicate the relative amount of distance or travel time required before flaps should be extended according to the approach scenario.

In the illustrated embodiment, the configuration indicia 620, 622 each include a vertical dashed line extending from the indicia 620, 622 that spans from the upper edge to the lower edge of the display 600 and intersects the reference axis 602 to indicate the relative horizontal difference of the indicia 620, 622 with respect to the aircraft indicator 606, and thereby the real-world lateral situation of those configuration changes according to the approach scenario relative to the current lateral situation of the aircraft 102. Additionally, the configuration indicia 620, 622 include a filled circle, ball, or other marking that is vertically positioned along the dashed vertical line at a position respect to the aircraft indicator 606 that indicates the relative altitude difference between the current aircraft altitude and the targeted altitude for the configuration changes according to the approach scenario (e.g., the altitude where the configuration changes are intended to occur according to the approach scenario). Thus, as the aircraft 102 ascends or descends, the relative vertical distance between the aircraft indicator 606 and the configuration change indicia 620, 622 may increase or decrease, thereby assisting the pilot in understanding the current state of the aircraft relative to the stable approach path. In the illustrated embodiment, the configuration change indicia 620, 622 are labeled to identify the nature of the respective configuration change associated therewith (e.g., D for deceleration, F1 for extending to the first flap position, etc.). Like GUI displays 400, 500, the GUI display 600 also includes a textual indicator 630 that provides hints, suggestions, or other notifications or guidance to the pilot for executing the approach.

Figure 7:
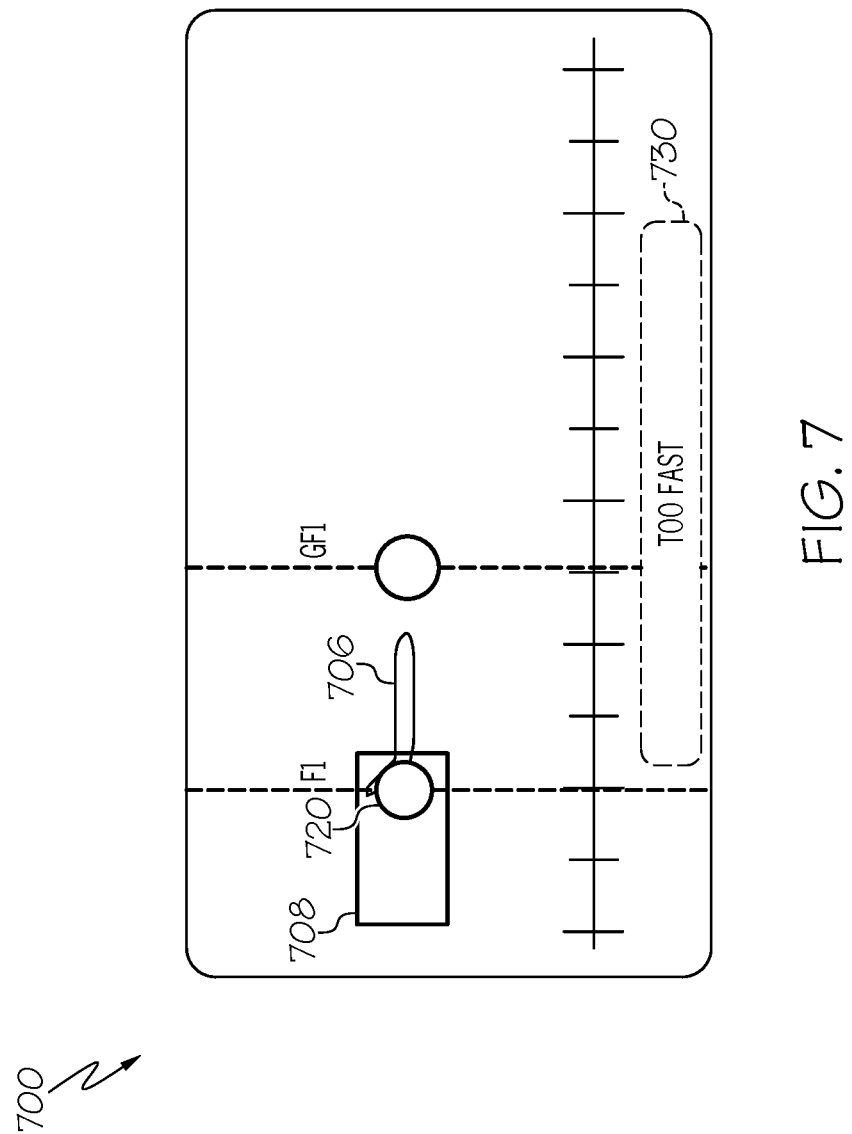

FIG. 7 depicts an exemplary vertical profile supplemental energy management GUI display 700 illustrating a situation where the current aircraft speed (or lateral position), represented by the aircraft position indicator 706, is greater than the targeted aircraft speed (or lateral position) according to the stable approach scenario, represented by target aircraft position indicator 708. For the situation depicted in FIG. 7, the pilot has also failed to initiate the configuration change to extend the flaps to the first extension position as indicated by flap configuration change indicator 720. As described above, the flap configuration change indicator 720 may persist on the display 700 and progressively advance beyond the aircraft position indicator 706 in the absence of the pilot initiating the change. The GUI display 700 also includes a textual notification 730 that the aircraft is traveling at a speed that poses a risk of requiring speedbrakes or otherwise potentially compromising the stable approach.

Figure 8:
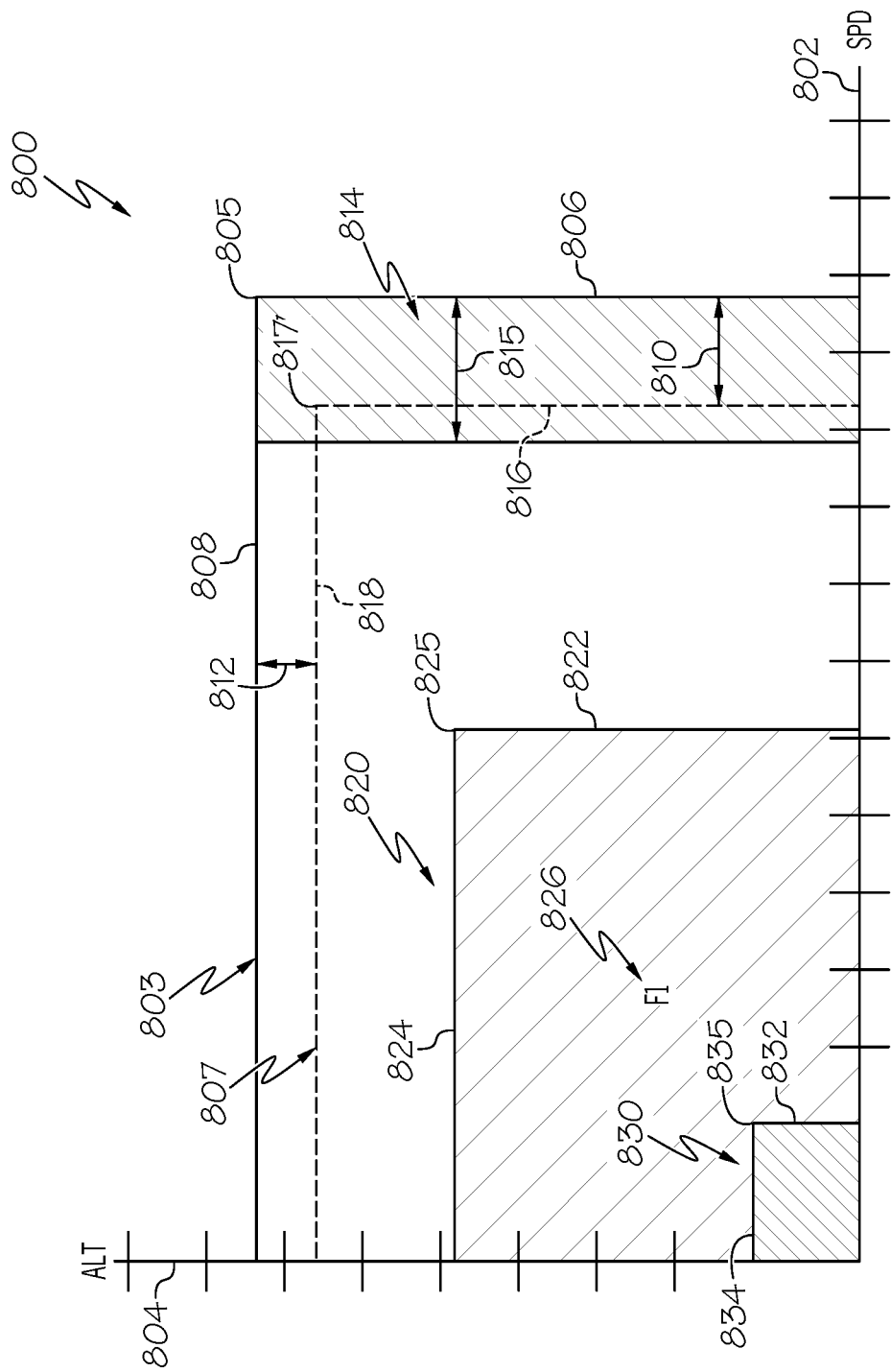
FIG. 8 depicts an exemplary graph GUI display including graphical indicia of the current energy state of the aircraft suitable for presentation on a display device in the aircraft system of FIG. 1 in conjunction with the approach guidance display process of FIG. 2 in accordance with one or more embodiments.

FIG. 8 depicts an embodiment of a graph supplemental energy management GUI display 800 suitable for presentation on a supplemental display device onboard an aircraft in conjunction with the approach guidance display process 300 of FIG. 3. The graph GUI display 800 is two-dimensional and includes a first reference axis 802 corresponding to a first energy management parameter or attribute characterizing the current energy state for the aircraft and a second reference axis 704 corresponding to a different energy management parameter or attribute characterizing the current energy state. For example, in the illustrated embodiment, the horizontal reference axis 802 corresponds to the aircraft speed and the vertical reference axis 804 corresponds to the aircraft altitude.

The current aircraft energy state is represented by a rectangle 803 (or box) bounded on two sides by the reference axes 802, 804 and a pair of line segments 806, 808 perpendicular to the respective axes 802, 804 that intersect at a point 805 (or vertex) corresponding to the current aircraft energy state. In this regard, the horizontal distance between the vertical axis 804 and the current aircraft state point 805 (i.e., the length of the horizontal line segment 808) corresponds to the current aircraft speed relative to a reference speed associated with an origin point where the axes 802, 804 intersect, and the vertical distance between the horizontal axis 802 and the current aircraft state point 805 (i.e., the length of the vertical line segment 806) corresponds to the current aircraft altitude relative to a reference altitude associated with the origin point where the axes 802, 804 intersect. The position of the vertical line segment 806 (or edge) indicates the current aircraft speed with respect to the horizontal speed axis 802 while the horizontal line segment 808 (or edge) indicates the current aircraft altitude with respect to the vertical altitude axis 804.

The targeted aircraft energy state according to the approach scenario for the current lateral position of the aircraft is represented by another rectangle 807 (or box) bounded on two sides by the reference axes 802, 804 and a pair of line segments 816, 818 perpendicular to the respective axes 802, 804 that intersect at a point 817 corresponding to the targeted aircraft energy state. In this regard, the horizontal distance between the vertical axis 804 and the targeted energy state point 817 (i.e., the length of the horizontal line segment 818) corresponds to the targeted aircraft speed relative to the current aircraft speed with respect to the horizontal speed axis 802, and the vertical distance between the horizontal axis 802 and the targeted aircraft state point 817 (i.e., the length of the vertical line segment 816) corresponds to the targeted aircraft altitude relative to the current aircraft altitude with respect to the vertical altitude axis 804. In the illustrated embodiment, the targeted aircraft speed and the targeted aircraft altitude are both less than the current speed and altitude of the aircraft at the current lateral position within the approach scenario being flown. The vertical line segment 818 indicates the targeted aircraft speed with respect to the horizontal speed axis 802, with the horizontal distance 810 between line segments 806, 816 corresponding to the relative difference between the current aircraft speed and the targeted aircraft speed. The horizontal line segment 808 indicates the targeted aircraft altitude with respect to the vertical altitude axis 804, with the vertical distance 812 between line segments 808, 818 corresponding to the relative difference between the current aircraft altitude and the targeted aircraft altitude.

In the illustrated embodiment, a fill region 814 is displayed or otherwise presented within the rectangle having the larger dimension with respect to the horizontal axis 802 to indicate the energy surplus (or gap) between the current and targeted energy states. In this regard, the horizontal width 815 is chosen such that the total area of the fill region 814 reflects the relative energy differential between the current energy state and the targeted energy state, which may be calculated based on the respective differences in the current and targeted altitudes, speeds, and/or other parameters. The color, pattern, or other visually distinguishable characteristic of the fill region 814 may be configured to correspond to the relative energy differential. For example, the fill region 814 may be rendered using amber for the illustrated example to indicate the current energy level is high relative to the target, while blue may be used to indicate an energy level that is below the target energy state.

On the graph GUI display 800, a configuration change is similarly indicated by a rectangle 820 (or box) defined by a pair of line segments 822, 824 that intersect at a point 825 corresponding to the aircraft speed and altitude associated with the configuration change according to the approach scenario, that is, the combination of aircraft speed and altitude that defines the start of the segment to be flown in that respective aircraft configuration. The configuration change box 820 may include text 826 that identifies or otherwise indicates the configuration change that is to occur upon reaching that altitude and/or speed (e.g., F1 for the first flap extension position). Additionally, in some embodiments, the configuration change box 820 may be rendered with a visually distinguishable fill color, pattern, or other characteristic that allows a pilot to more quickly differentiate the configuration change box 820 from the energy state boxes 803, 807.

In exemplary embodiments, the stabilization target position is also represented by a rectangle 830 (or box) defined by a pair of line segments 832, 834 that intersect at a point 835 corresponding to the stabilization target position. In this regard, the upper horizontal edge 834 of the box 830 intersects the vertical axis 804 at a location corresponding to the altitude associated with the stabilization target position (e.g., 1000 feet), and the vertical edge 832 of the box 830 intersects the horizontal axis 802 at a location corresponding to an aircraft speed that satisfies one or more stabilization criteria associated with the stabilization target position.

As the aircraft travels along the approach path, the target and current energy state boxes 803, 807 dynamically update to reflect the current energy state of the aircraft and the targeted energy state for the aircraft's current lateral position according to the approach scenario being flown while the configuration change and stabilization target boxes 820, 830 are statically displayed. In this regard, as the aircraft descends and decelerates, the energy state vertices 805, 817 may dynamically converge toward the flap extension point 825 and eventually the stabilization target point 835. Thus, the pilot utilizing the graph GUI display 800 may adjust operation of the aircraft to attempt to align the energy state vertices 805, 817 and initiate configuration changes upon one or more of the current energy state edges 806, 808 crossing into the flap configuration change box 820.

Figure 9:
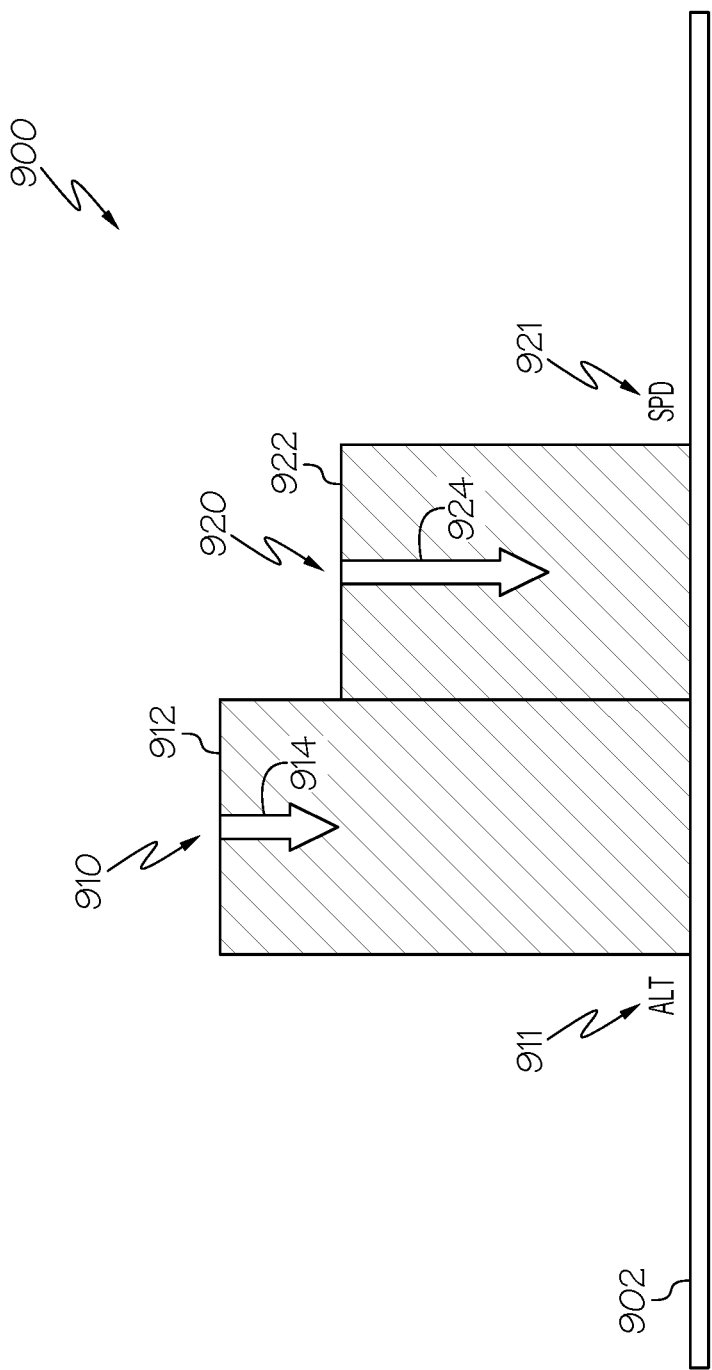
FIG. 9 depicts an exemplary bar chart GUI display including graphical indicia of the current energy state of the aircraft suitable for presentation on a display device in the aircraft system of FIG. 1 in conjunction with the approach guidance display process of FIG. 2 in accordance with one or more embodiments.

FIG. 9 depicts a bar chart supplemental energy management GUI display 900 suitable for presentation on a supplemental display device onboard an aircraft in conjunction with the approach guidance display process 300 of FIG. 3. The bar chart GUI display 900 includes a horizontal reference axis 902, a first rectangular bar 910 corresponding to a first parameter (or attribute) characterizing the current energy state (e.g., the current aircraft altitude), and a second rectangular bar 920 corresponding to a second parameter (or attribute) characterizing the current energy state (e.g., the current aircraft speed). The reference axis 902 corresponds to the respective targeted values for the depicted parameters, such that the vertical distance between the reference axis 902 and the location of the horizontal edge 912 of the altitude bar 910 corresponds to the relative difference between the current aircraft altitude and the targeted aircraft altitude for the current lateral position within the approach scenario, and the vertical distance between the reference axis 902 and the location of the horizontal edge 922 of the speed bar 920 corresponds to the relative difference between the current aircraft speed and the targeted aircraft speed for the current lateral position within the approach scenario. Thus, the bars 910, 920 represent the relative deviations from the targeted energy state and may alternatively be referred to herein as deviation bars. In the illustrated embodiment, the deviation bars 910, 920 are adjacent to one another and bookended by textual labels 911, 921 of the respective parameter depicted by the neighboring deviation bar 910, 920.

In exemplary embodiments, the deviation bars 910, 920 include graphical indicia 914, 924 emanating from the horizontal edges 912, 922 that indicate the current or predicted rate of change of the deviation of the depicted parameters. In this regard, the rate of change indicators 914, 924 represent the rate of change of the differential between the current value for the depicted parameter, which may be dynamically varying or changing in real-time as the aircraft travels laterally, and the target value for the depicted parameter, which is also dynamically varying or changing as the aircraft travels laterally according to the approach scenario being flown. Thus, the rate of change indicators 914, 924 correspond to the acceleration of the respective parameter with respect to the target value.

FIG. 9 depicts a scenario where the altitude deviation bar 910 indicates the aircraft is currently above the targeted altitude for the current lateral position on the approach path, but the altitude deviation acceleration indicator 914 indicates that the current or predicted rate of descent is greater than the target rate of descent defined by the approach scenario, and as a result, is descending towards the target altitude. Similarly, the speed deviation bar 920 indicates the aircraft is currently traveling faster than the target aircraft speed for the current lateral position on the approach path, but the speed deviation acceleration indicator 924 indicates that the current or predicted rate of deceleration is greater than the target deceleration defined by the approach scenario, and as a result, the aircraft speed is decelerating towards the target speed. In exemplary embodiments, the vertical dimensions of the deviation bars 910, 920 and the deviation acceleration indicia 914, 924 are all scaled to accurately indicate the relative differentials or relative rates of change. Thus, the difference in length between the speed deviation acceleration indicator 924 and the altitude deviation acceleration indicator 914 indicates the current aircraft speed is converging towards the targeted aircraft speed at a proportionally faster rate than the current aircraft altitude. Additionally, the difference in distance between the altitude deviation marker 912 and the speed deviation marker 922 indicates the current aircraft speed is proportionally closer to the target speed than the current aircraft altitude. Thus, a pilot may utilize the bar chart GUI display 900 to identify or determine which energy state parameter requires greater attention and adjust operation of the aircraft accordingly to achieve a desired tradeoff between energy state parameters.

For example, the pilot may determine to descend faster to bring the altitude more in line with the target altitude, which may incur an attendant reduction in deceleration.

As the aircraft travels, the distance between the edges 912, 914 of the bars 910, 920 and the reference axis 902 dynamically update to reflect the relative differences between the updated values of the energy state parameters and the target values for the energy state parameters at the real-time position of the aircraft along the approach path. Additionally, the bars 910, 920 may be rendered using a visually distinguishable fill color, pattern, or other characteristic to more quickly convey the relative energy differential. For example, the deviation bars 910, 920 in FIG. 9 may be presented with an amber fill to indicate the current energy level is high relative to the target. A pilot may utilize the bar chart GUI display 900 to determine how to operate the aircraft to minimize or eliminate the length or height of the deviation bars 910, 920. It should be noted that even when the edge 912, 922 of a deviation bar 910, 920 aligns with the reference axis 902, deviation acceleration indicia 914, 924 may still be presented to guide the pilot in preventing future deviations.

Figure 10:
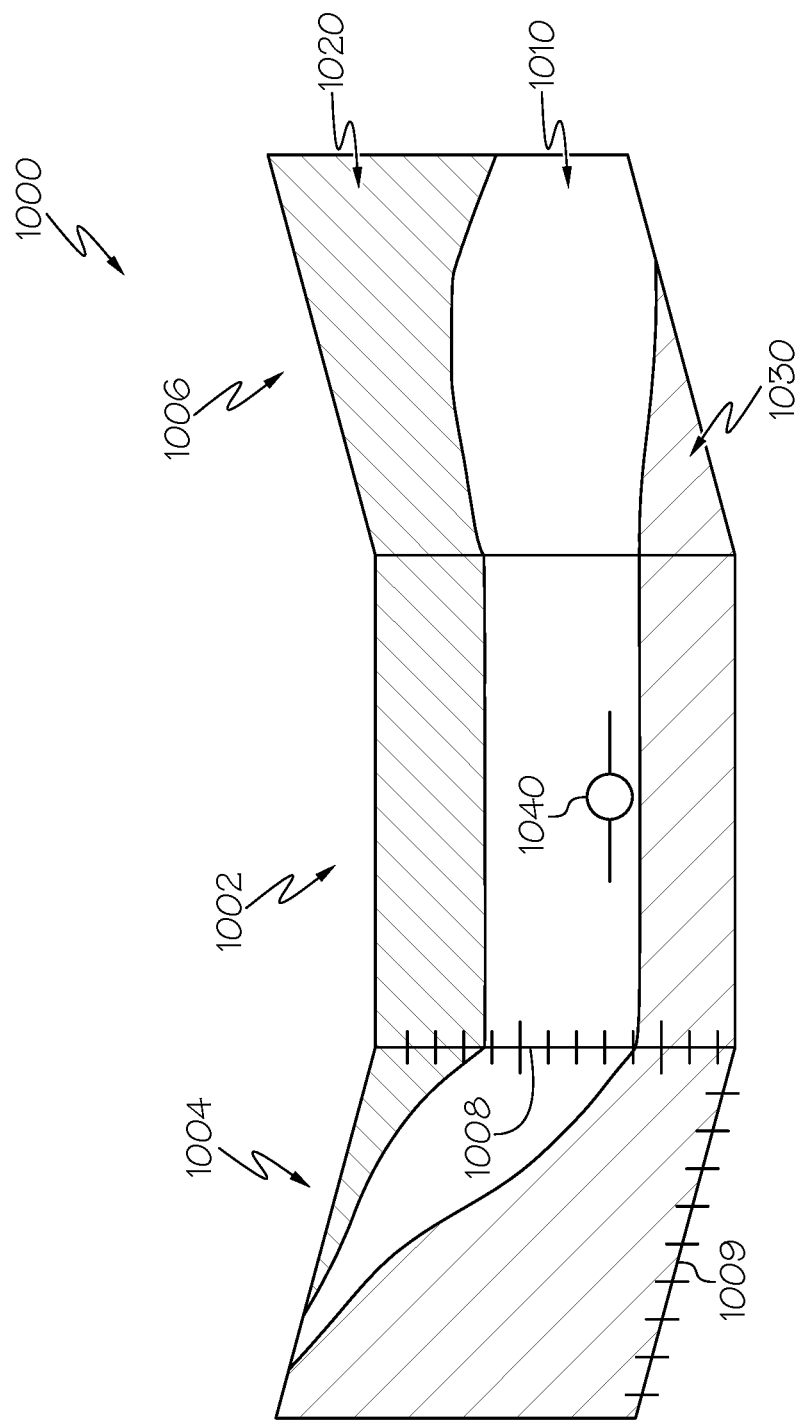
FIG. 10 depicts an exemplary multi-panel GUI display including graphical indicia of the current energy state of the aircraft suitable for presentation on a display device in the aircraft system of FIG. 1 in conjunction with the approach guidance display process of FIG. 2 in accordance with one or more embodiments.

Turning now to FIG. 10, in another embodiment, the approach guidance display process 300 of FIG. 3 may utilize a multi-panel supplemental energy management GUI display 1000. The multi-panel GUI display 1000 includes a center panel 1002 corresponding to a spatial area in front of the aircraft along the current heading, with left and right panels 1004, 1006 corresponding to spatial areas to the left and right of the current heading, respectively. It should be appreciated that the panels 1002, 1004, 1006 of the multi-panel GUI display 1000 may be virtually divided panels on a single panel display or individual display device, as opposed to multiple different display devices.

The multi-panel GUI display 1000 also includes a plurality of energy zones 1010, 1020, 1030 that extend laterally across the panels 1002, 1004, 1006 of the display 1000. A central energy zone 1010 corresponds to an aircraft energy state that is substantially equal to the targeted energy state for the current lateral position within the approach scenario. An upper energy zone 1020 corresponds to an aircraft energy state that is greater than the targeted energy state range represented by the target energy zone 1010, and a lower energy zone 1030 corresponds to an aircraft energy state that is less than the targeted energy state range represented by the target energy zone 1010. FIG. 10 depicts an example of the energy zones 1010, 1020, 1030 where turning the aircraft to the left or otherwise reorienting the heading of the aircraft to the left increases the distance-to-go, thereby decreasing the relative energy levels by increasing the amount of distance available to reduce the energy, while turning the aircraft to the right or otherwise reorienting the heading of the aircraft to the right decreases the distance-to-go, thereby increasing the relative energy levels by decreasing the amount of distance available to reduce the energy.

In one embodiment, to determine the different energy zones, a plurality of different approach scenarios are calculated or otherwise determined for different combinations of potential initial aircraft states (e.g., altitudes and headings) about the current aircraft state (corresponding to indicator 1040) defined by the current aircraft altitude, current aircraft heading, etc. Thereafter, the different approach scenarios for the neighboring aircraft states about the current aircraft state may be qualitatively classified, categorized, or ranked with respect to one another based on the amount of additional drag configurations required (e.g., high energy states), the amount of additional thrust or fuel that may be required (e.g., low energy states), and potentially other factors (either individually or in combination). for achieving a stable approach from that aircraft state. Thus, the high energy zone 1020 may correspond to potential aircraft altitudes or headings relative to the current altitude and heading where additional drag (e.g., use of speedbrakes) is required for a stable approach to the destination airport relative to the amount of drag required by the originally planned stable approach or from the current aircraft state, while the low energy zones 1030 may correspond to potential aircraft altitudes or headings relative to the current altitude and heading where additional fuel or thrust is required for a stable approach to the destination airport relative to the amount of fuel or thrust required by the originally planned stable approach or from the current aircraft state.

In exemplary embodiments, the energy zones 1010, 1020, 1030 are rendered using visually distinguishable characteristics that allow the pilot to readily differentiate the energy zones. For example, the high energy zone 1020 may be filled with an amber color to indicate the energy level is too high when an indicator of the current aircraft energy state is depicted therein, with the low energy zone 1030 being filled with a blue color to indicate the energy level is too low within that region, while the target energy zone 1010 may be rendered in a plain or native form without any visually distinguishable fill characteristics.

Based on the current speed and altitude of the aircraft, the current energy level for the aircraft may be calculated and a graphical indicator 1040 of the current aircraft energy state is depicted horizontally centered within the center panel 1002 at a vertical position that corresponds to the current energy level of the aircraft relative to the target energy zone 1010. In this regard, FIG. 10 depicts a situation where the current energy level is within the target energy zone 1010 is slightly below the targeted energy level according to the approach scenario, which corresponds to the vertical midpoint of the target energy zone 1010.

The multi-panel GUI display 1000 depicts the prospective relative energy level of the aircraft in response to changes to the flight path angle or heading of the aircraft for its current speed, current distance to destination, and current drag configuration. For example, operating the aircraft to turn or otherwise adjust the aircraft heading to the left and/or operating the aircraft to descend (e.g., by increasing the flight path angle) may result in the aircraft indicator 1040 entering the low energy zone 1030. Conversely, ascending or turning the aircraft to the right may result in the aircraft indicator 1040 entering the high energy zone 1020, while maintaining an idle descent at the current heading and pitch (or flight path angle) maintains the aircraft indicator 1040 within the target energy zone 1010. The multi-panel GUI display 1000 also includes a vertical reference axis 1008 used to indicate the relative altitude depicted on the GUI display 1000 and a horizontal reference axis 1009 used to indicate the relative heading or lateral situation of the GUI display 1000 as the pilot operates the aircraft to adjust the orientation.

As the aircraft travels, the energy zones 1010, 1020, 1030 dynamically update to reflect the targeted energy state for the current lateral position or distance-to-go for the approach scenario being flown, along with any changes to the aircraft orientation, while the vertical position of the aircraft indicator 1040 with respect to the energy zones 1010, 1020, 1030 is dynamically updated within the central panel 1002 to reflect the current energy state of the aircraft, that is, the real-time altitude and speed of the aircraft. A pilot may utilize the multi-panel GUI display 1000 to determine how to react to an aircraft energy state that is outside of the target energy zone 1010. For example, to return to the target energy zone 1010 when the aircraft indicator 1040 is in the high energy zone 1020, the pilot may choose to increase the drag configuration of the aircraft (which would shrink the dimensions of the high energy zone 1020 by reclassifying some potential initial aircraft states from the high energy zone 1020 to the target energy zone 1010), increase the descent angle (e.g., by decreasing the angle of attack), and/or turning the aircraft towards the left to increase the available distance for decreasing the energy level and attempt to bring the aircraft indicator 1040 back within the target energy zone 1010. Conversely, when the aircraft indicator 1040 is within the low energy zone 1030, the pilot may choose to decrease the descent angle (e.g., by increasing the angle of attack), turning the aircraft to the right to decrease the distance-to-go, or increase thrust.

Figure 11:
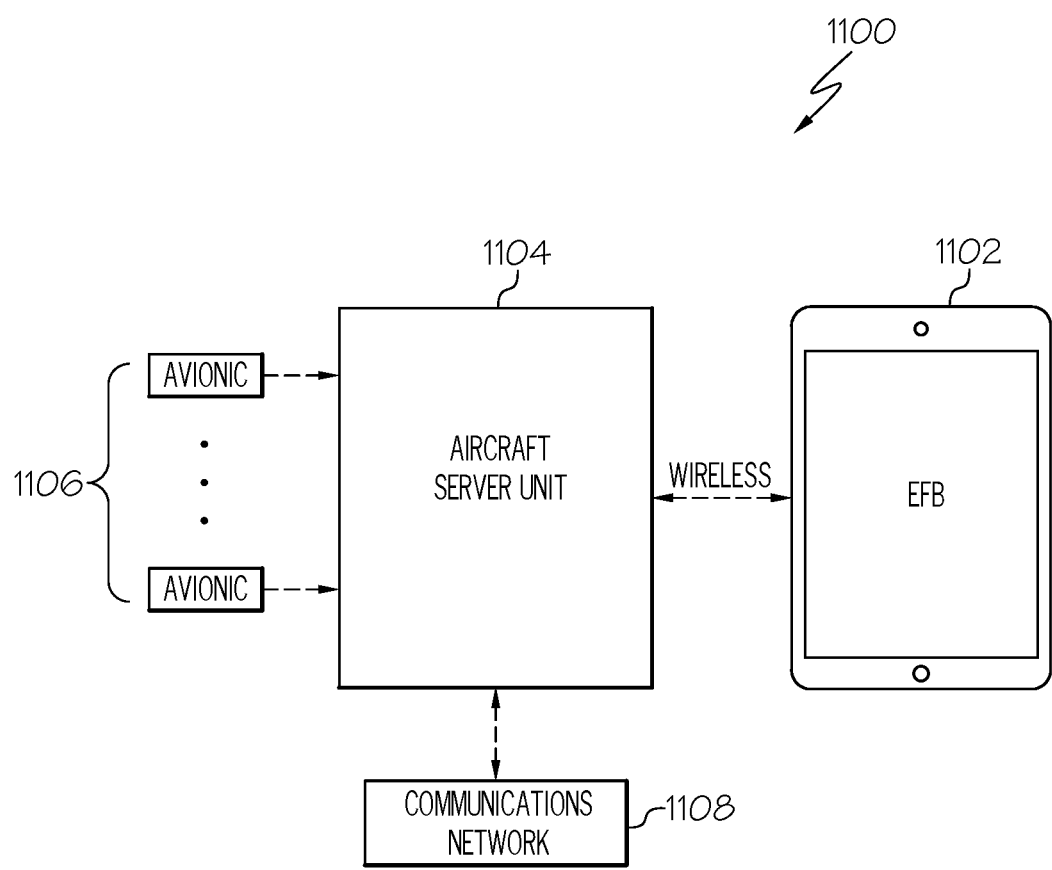
FIG. 11 depicts an exemplary embodiment of an electronic flight bag (EFB) system suitable for implementing the approach guidance display process of FIG. 3 in conjunction with the aircraft system of FIG. 1 in accordance with one or more embodiments.

FIG. 11 depicts an exemplary embodiment of an electronic flight bag (EFB) system 1100 suitable for implementing the subject matter described herein. The EFB system includes an electronic device 1102 (alternatively referred to as the EFB) that is communicatively coupled to a host device 1104 that is communicatively coupled to one or more of the avionics systems 1106 onboard an aircraft (e.g., avionics systems 112, 114, 116, 118, 120). The host device 1104 generally represents a computer system configured support the approach guidance display process 300 described herein and provide corresponding supplemental energy management GUI displays on the electronic device 1102, and for purposes of explanation, but without limitation, the host device 1104 is referred to herein as a server unit (or server). In this regard, the host server 1104 includes at least a processing system (e.g., processing system 108) and/or other hardware computing resources along with one or more data storage elements (or memory) capable of storing instructions, that, when read and executed by the processing system, cause the host server 1104 to generate or otherwise support the approach guidance display process 300. The host server 1104 may also be coupled to a communications network 1108, which may be utilized to receive data and/or information (e.g., meteorological information, or the like) in conjunction with the approach guidance display process 300 and/or to support communications with the electronic device 1102.

In exemplary embodiments, the electronic device 1102 is realized as a laptop or notebook computer, a tablet computer, or another suitable computing device configured to provide EFB-functionality, and accordingly, the electronic device 1102 is alternatively referred to herein as an EFB. The EFB 1102 includes at least a display device (e.g., display device 104) and a processing system (e.g., processing system 108 and/or display system 110), a data storage element (or memory) configured to support generating energy management GUI displays as described herein. In various situations, the EFB 1102 may be subject to regulations or restrictions that limit the use of the EFB 1102 or the type or content of information presented thereon (e.g., no tactical information may be presented, etc.).

In one or more embodiments, a pilot of the aircraft utilizes the EFB 1102 to initiate the approach guidance display process 300 described above. That said, in other embodiments, the approach guidance display process 300 may automatically be initiated by the FMS 116 or other onboard avionics in response to identifying the start of the approach flight phase. The server 1104 accesses the avionics systems 1106 and/or the communications network 1108 to receive or otherwise obtain the current aircraft state information, such as the current position of the aircraft, the current altitude of the aircraft, the current speed of the aircraft, the current amount of fuel remaining onboard the aircraft, the meteorological information pertaining to the current aircraft position, and the like. Thereafter, the server 1104 identifies a stable approach scenario to the desired airport and provides indication of the relative energy state parameters or attributes to the EFB 1102, which, in turn, generates or otherwise provides a supplemental energy management GUI display on the display of the EFB 1102. Thus, the pilot may utilize the EFB 1102 to monitor the current aircraft energy state and operate the aircraft to manage energy accordingly to maintain approach towards the airport in a stable manner.

For the sake of brevity, conventional techniques related to approach procedures, aerodynamics, aircraft modeling, graphics and image processing, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of presenting an energy state associated with an aircraft on a graphical user interface display, the method comprising:
   providing, on a display device onboard the aircraft, the graphical user interface display comprising a reference axis, a first graphical indication of a targeted energy state at a first position with respect to the reference axis, a second graphical indication of a current energy state of the aircraft at a second position with respect to the reference axis, and a third graphical indication of a configuration change relative to a current aircraft state at a third position with respect to the reference axis, the configuration change comprising an aircraft configuration prescribed by a procedure for the aircraft, wherein:
   a first distance between the first position and the second position with respect to the reference axis on the graphical user interface display corresponds to a difference between a target parameter value associated with the targeted energy state and a current parameter value associated with the current energy state; and
   a second distance between the first position and the third position with respect to the reference axis on the graphical user interface display corresponds to an estimated amount of time before the configuration change; and
   dynamically updating the second distance on the graphical user interface display as the aircraft travels to dynamically advance the third graphical indication towards the second graphical indication at a rate corresponding to a current speed of the aircraft, wherein the first distance between the first graphical indication and the second graphical indication is dynamically updated to reflect a relative difference between an updated parameter value associated with an updated energy state of the aircraft and a dynamically updating target parameter value according to the procedure.

2. The method of claim 1, the graphical user interface display comprising a forward-looking display including a second reference axis oriented with respect to the reference axis to provide a perspective view, wherein:
   the first graphical indication comprises a first horizontal graphical indication intersecting the reference axis and the second reference axis;
   the second graphical indication comprises a second horizontal graphical indication intersecting the reference axis and the second reference axis;
   the third graphical indication comprises a third horizontal graphical indication intersecting the reference axis and the second reference axis;
   the first distance comprises a first vertical distance between the first horizontal graphical indication and the second horizontal graphical indication; and
   the second distance comprises a second vertical distance between the second horizontal graphical indication and the third horizontal graphical indication.

3. The method of claim 2, wherein dynamically updating the second distance comprises dynamically advancing the reference axis and the second reference axis towards the second horizontal graphical indication at a rate corresponding to the current speed of the aircraft, wherein the third horizontal graphical indication is fixed with respect to the reference axis and the second reference axis.

4. The method of claim 2, wherein:
   the reference axis and the second reference axis correspond to a speed of the aircraft;
   the target parameter value comprises a target speed associated with the targeted energy state;
   the current parameter value comprises the current speed associated with the current energy state; and
   the first difference corresponds to a relative difference between the target speed and the current speed.

5. The method of claim 1, the graphical user interface display comprising a vertical profile display, wherein:
   the reference axis comprises a horizontal axis;
   the first distance comprises a first horizontal distance between the first graphical indication and the second graphical indication with respect to the horizontal axis; and
   the second distance comprises a second horizontal distance between the second graphical indication and the third graphical indication with respect to the horizontal axis.

6. The method of claim 5, wherein:
   the horizontal reference axis corresponds to a speed of the aircraft;
   the target parameter value comprises a target speed associated with the targeted energy state;
   the current parameter value comprises the current speed associated with the current energy state; and
   the first difference corresponds to a relative difference between the target speed and the current speed.

7. The method of claim 1, the graphical user interface display comprising a graph profile display including a vertical reference axis, wherein:
   the reference axis comprises a horizontal reference axis;
   the first distance comprises a first horizontal distance between the first graphical indication and the second graphical indication with respect to the horizontal reference axis;
   the second distance comprises a second horizontal distance between the second graphical indication and the third graphical indication with respect to the horizontal reference axis; and
   providing the graphical user interface display comprises providing a fourth graphical indication of the targeted energy state at a fourth position with respect to the vertical reference axis and a fifth graphical indication of the current energy state of the aircraft at a fifth position with respect to the vertical reference axis, wherein a third distance between the fourth position and the fifth position with respect to the vertical reference axis corresponds to a second difference between a second target parameter value associated with the targeted energy state and a second current parameter value associated with the current energy state.

8. The method of claim 7, wherein:
   providing the graphical user interface display comprises providing a sixth graphical indication of the configuration change at a sixth position with respect to the vertical reference axis; and dynamically updating a fourth distance between the fifth position and the sixth position with respect to the vertical reference axis as the aircraft travels, wherein the third distance between the fourth graphical indication and the fifth graphical indication is dynamically updated to reflect a second updated parameter value associated with the updated energy state of the aircraft.

9. The method of claim 7, wherein the horizontal reference axis corresponds to a speed of the aircraft and the vertical reference axis corresponds to an altitude of the aircraft.

10. The method of claim 1, wherein:
the reference axis corresponds to a speed of the aircraft;
the target parameter value comprises a target speed associated with the targeted energy state;
the current parameter value comprises the current speed associated with the current energy state; and
the first difference corresponds to a relative difference between the target speed and the current speed.

11. The method of claim 1, further comprising:
determining a stable approach scenario for descending to a stabilization target position;
obtaining a current position of the aircraft; and
determining the target parameter value based on the targeted energy state for the current position within the stable approach scenario.

12. The method of claim 11, wherein:
the configuration change comprises a drag configuration of the aircraft prescribed by the stable approach scenario at a future position; and
the second distance corresponds to the estimated amount of time for reaching the future position from the current position based on the current speed of the aircraft.

13. A non-transitory computer-readable medium having computer-executable instructions stored thereon that, when executed by a processing system coupled to the display device, cause the processing system to perform the method of claim 1.

14. The method of claim 1, the graphical user interface display comprising a supplemental energy management graphical user interface display, wherein providing the graphical user interface display comprises an electronic flight bag (EFB) presenting the supplemental energy management graphical user interface display.

15. The method of claim 1, wherein the procedure comprises a stable approach scenario.

16. The method of claim 15, wherein the configuration change comprises a drag configuration.

* * * * *